US009465121B2

(12) United States Patent
Lin et al.

(10) Patent No.: US 9,465,121 B2
(45) Date of Patent: Oct. 11, 2016

(54) SYSTEM AND METHOD FOR ON-SITE INSTANT SEISMIC ANALYSIS

(75) Inventors: Pei-Yang Lin, Taipei (TW); Tao-Ming Chang, Taipei (TW); Tzu-Kang Lin, Taipei (TW); Shieh-Kung Huang, Taipei (TW); Hung-Wei Chiang, Taipei (TW); Zhe-Ping Shen, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 964 days.

(21) Appl. No.: 13/587,115

(22) Filed: Aug. 16, 2012

(65) Prior Publication Data
US 2013/0046475 A1    Feb. 21, 2013

(30) Foreign Application Priority Data

Aug. 19, 2011  (TW) .............................. 100129848 A
Mar. 30, 2012  (TW) .............................. 101111394 A

(51) Int. Cl.
*G01V 1/00* (2006.01)
*G01V 1/28* (2006.01)
*G01V 1/22* (2006.01)

(52) U.S. Cl.
CPC .............. *G01V 1/008* (2013.01); *G01V 1/003* (2013.01); *G01V 1/22* (2013.01); *G01V 1/28* (2013.01)

(58) Field of Classification Search
USPC ........................................................ 702/15
See application file for complete search history.

(56) References Cited

U.S. PATENT DOCUMENTS

| 2003/0021183 | A1* | 1/2003 | Mueller-Dombois | ........ 367/13 |
| 2007/0131486 | A1* | 6/2007 | Yamagishi | .................. 187/313 |
| 2008/0208721 | A1* | 8/2008 | Bertogg | ......................... 705/35 |
| 2011/0182412 | A1* | 7/2011 | Takuno et al. | ................. 379/39 |
| 2011/0270793 | A1* | 11/2011 | Bertogg | ......................... 706/50 |
| 2013/0328688 | A1* | 12/2013 | Price et al. | ................... 340/690 |

* cited by examiner

*Primary Examiner* — Paul D Lee
(74) *Attorney, Agent, or Firm* — Muncy, Geissler, Olds & Lowe, P.C.

(57) ABSTRACT

A system and method instantly on-site analyze seismic acceleration signals measured from a primary wave of an earthquake and at a detecting site. The system includes an embedded computing host and a signal preprocessing module. Hardware preprocessing is executed on the seismic acceleration signals; and whether the earthquake is a seismic event is able to be determined according to a seism determining logic. Seismic acceleration signals are converted into ground velocities and ground displacements to obtain a peak ground displacement. A seismic fracture time parameter is calculated through the ground velocities and ground displacements and then a seismic magnitude of the earthquake is obtained. According to the peak ground displacement and the seismic magnitude, an epicentral distance is further calculated. Then a peak ground acceleration of the earthquake's shear wave at the detection site is able to be obtained through the seismic magnitude and the epicentral distance.

12 Claims, 17 Drawing Sheets

SYSTEM AND METHOD FOR ON-SITE INSTANT SEISMIC ANALYSIS

CROSS-REFERENCES TO RELATED APPLICATIONS

This non-provisional application claims priority under 35 U.S.C. §119(a) on Patent Application No. 100129848 and 101111394 filed in Taiwan, R.O.C. on 2011 Aug. 19 and 2012 Mar. 30, the entire contents of which are hereby incorporated by reference.

BACKGROUND

1. Technical Field

The disclosure relates to earthquake prediction technologies, in particular to a system and method for on-site instant seismic analysis.

2. Related Art

Different from a wide-range earthquake analysis system based on measure data from a number of measuring stations, an on-site instant earthquake analysis system uses only the data instantly on-site measured for analysis and calculation, so it is quite difficult for the on-site instant earthquake analysis system to achieve a high accuracy prediction. Generally the on-site instant earthquake analysis system needs to instantly compute massive earthquake data and issue a front alarm in only seconds for a strong earthquake; the limited computing time and the conventional system design make the current system incapable of providing satisfied analysis results.

Furthermore, to reduce the damages by a strong earthquake and evacuate the crowds in buildings timely, a front-alarm earthquake analysis system must be very reliable. However, for seismic responses of buildings, currently it takes tens of minutes or even several hours to complete computing through a pre-established dynamical structural model of a building, which is not enough to fulfill the instant front-alarm requirements for a strong earthquake.

SUMMARY

Accordingly, in one or more embodiments of the disclosure, a system is provided for on-site instantly analyzing a primary wave of an earthquake measured at a detecting site to predict a shear wave of the earthquake about to arrive the detecting site. The system includes a signal preprocessing module and an embedded computing host. The signal preprocessing module receives plural seismic acceleration signals of the primary wave measured at the detecting site and executes a hardware preprocessing procedure on the seismic acceleration signals. The embedded computing host receives the seismic acceleration signals preprocessed by the signal preprocessing module to predict the peak ground acceleration (PGA) of the shear wave. After the hardware preprocessing procedure, the seismic acceleration signals are converted into a plurality of ground velocities and ground displacements of the primary wave, to obtain a peak ground displacement within a first duration. The embedded computing host further calculates a seismic fracture time parameter according the ground velocities and the ground displacements within a second duration, thereby calculating a seismic magnitude of the earthquake at the detecting site. The embedded computing host further calculates an epicentral distance according to the peak ground displacement and the seismic magnitude, and then calculates the predicted peak ground acceleration of the shear wave at the detecting site according to the seismic magnitude and the epicentral distance.

In one or more embodiments, a method is provided for on-site instantly analyzing a primary wave of an earthquake measured at a detecting site to predict a shear wave of the earthquake about to arrive the detecting site. The method includes the follows sections: executing a hardware preprocessing procedure on plural seismic acceleration signals of the primary wave measured at the detecting site; converting the seismic acceleration signals into plural ground velocities and ground displacements of the primary wave; obtaining a peak ground displacement within a first duration; calculating a seismic fracture time parameter according to the ground velocities and the ground displacements within a second duration, thereby calculating a seismic magnitude of the earthquake at the detecting site; calculating an epicentral distance according to the peak ground displacement and the seismic magnitude; and according to the seismic magnitude and the epicentral distance, calculating a predicted peak ground acceleration (PGA) of the shear wave of the earthquake arriving the detecting site.

In one or more embodiments, a method is provided for on-site instantly analyzing a primary wave of an earthquake measured at a detecting site to predict at least an estimated seismic values for a specific floor in a building when a shear wave of the earthquake arrives. The method includes the following sections: receiving plural earthquake characteristic parameters of the primary wave; selecting one of plural floor regression formulas according to an epicentral location and an epicentral distance of the earthquake; substituting at least one of the earthquake characteristic parameters of the primary wave into the selected floor regression formula to calculate an amplifying parameter for the specific floor; and calculating the predicted peak floor acceleration values for the specific floor according to the amplifying parameter.

BRIEF DESCRIPTION OF THE DRAWINGS

The disclosure will become more fully understood from the detailed description given herein below for illustration only, and thus not limitative of the present invention, wherein.

DETAILED DESCRIPTION

According to the system and method introduced in the following embodiments of the disclosure, if only the first three seconds of seismic data for a primary wave measured in a detecting station are used to calculate the corresponding earthquake characteristic parameters and achieve a certain accuracy for instant alarm, it is possible for the disclosed system and method to move the alarmable range closer from a 70 km epicentral distance to 10-50 km. The actual data depends on the hardware/software/firmware actually used in combination, or depends on the land characteristics along the path transmitting the earthquake wave or other possible variables.

Figure 1:
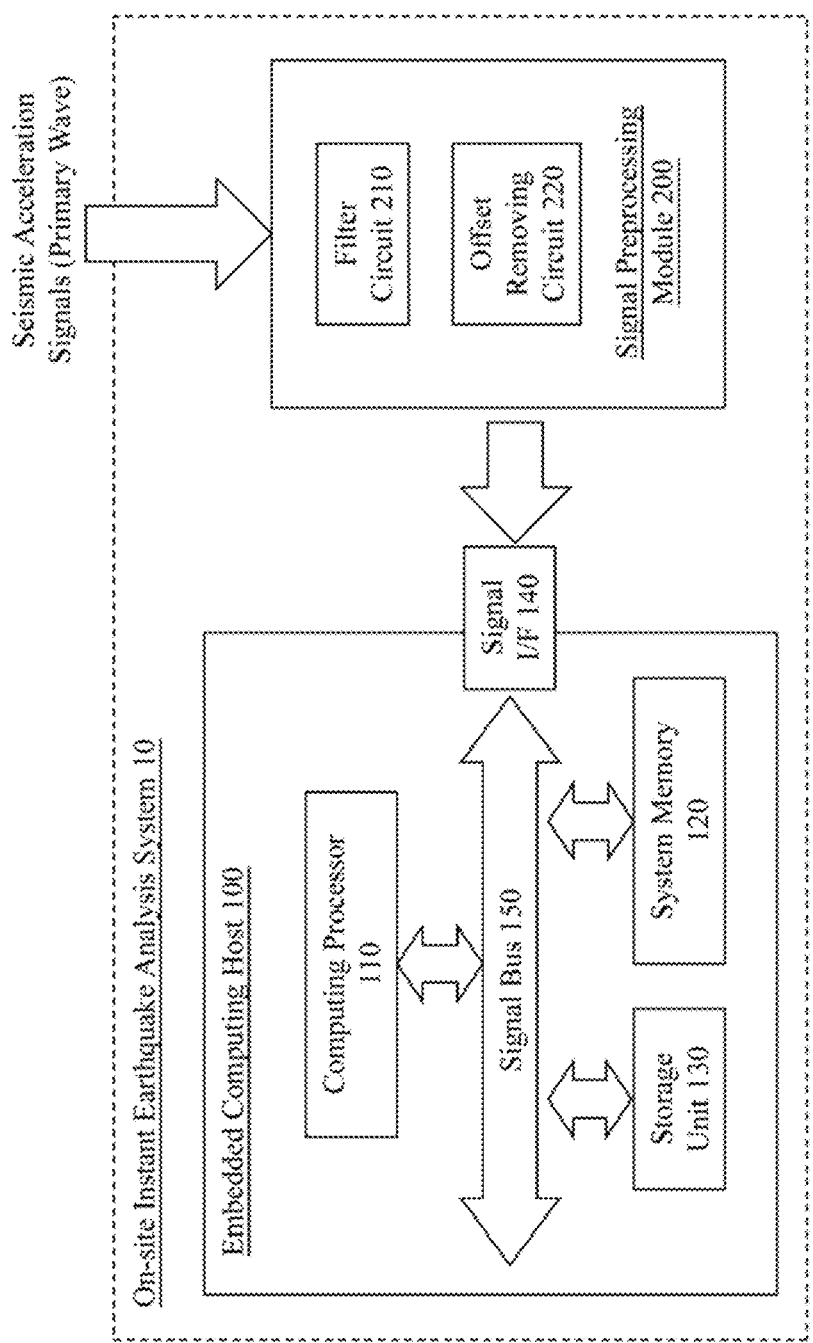
FIG. 1 is a systematic block diagram of an on-site instant earthquake analyzing system according to an embodiment of the disclosure.
Figure 2:
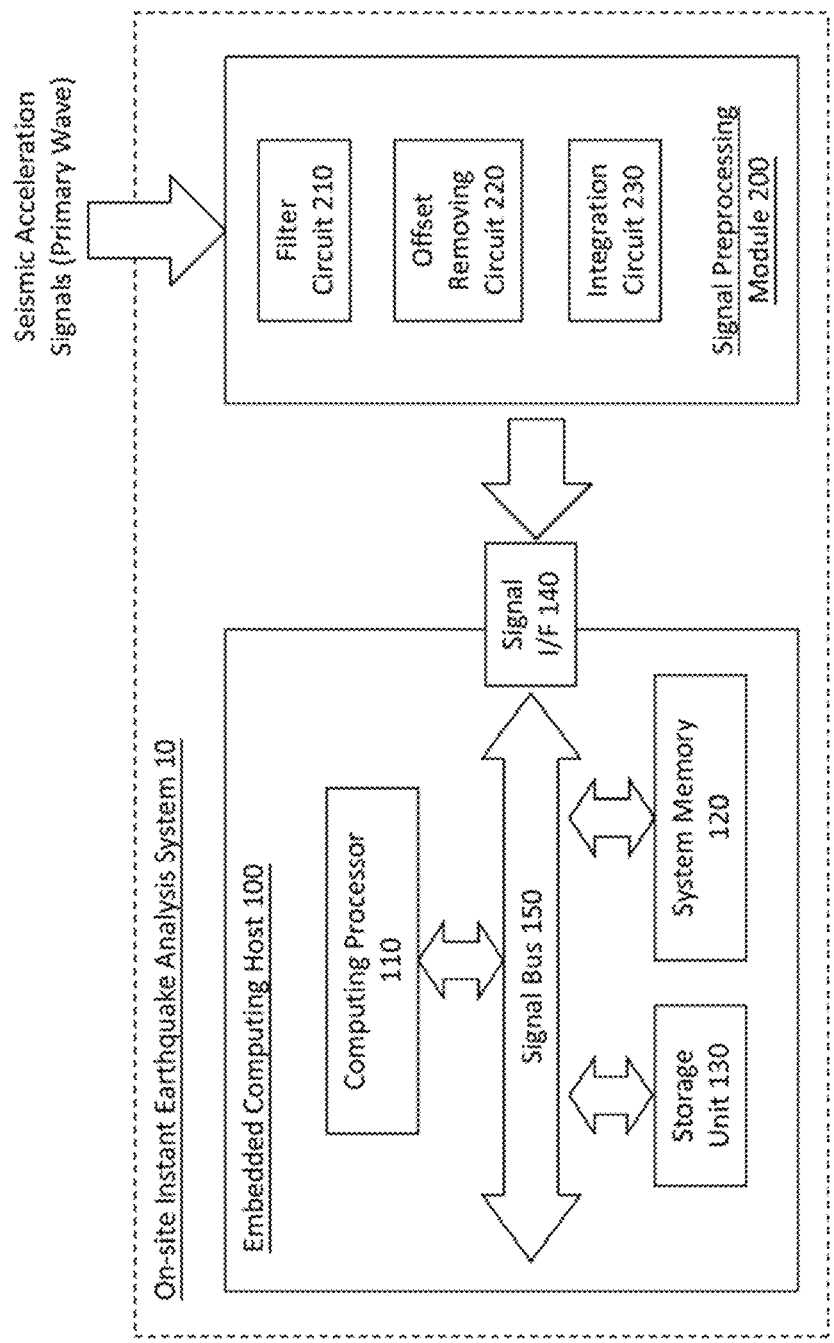
FIG. 2 is another systematic block diagram of another on-site instant earthquake analyzing system according to an embodiment.

Please refer to FIG. 1 and FIG. 2, which are two system block diagrams of two on-site instant earthquake analyzing system according to two embodiments. An on-site instant earthquake analyzing system 10 includes an embedded computing host 100 and a signal preprocessing module 200. The signal preprocessing module 200 mainly executes signal pre-processing of the original seismic acceleration signal of a primary wave of an earthquake, while the embedded computing host 100 executes several algorithm computing procedures.

One of the system design goals is to shorten the computing time for the required earthquake characteristic parameters, so the hardware design needs to efficiently reduce the computing loading at the algorithm computing section, namely the embedded computing host 100. Depending on actual installations of various hardware components, in an embodiment, the embedded computing host 100 and the signal preprocessing module 200 may be realized by an integrated mother board installed with all the required hardware components and suitable signal buses and signal interfaces/connectors. In another embodiment, the embedded computing host 100 and the signal preprocessing module 200 may be realized by standalone hardware components with suitable signal cables or signal interfaces to electrically connect the embedded computing host 100 and the signal preprocessing module 200.

In an embodiment, the source of the original seismic acceleration signals of the primary wave of an earthquake is an acceleration seismometer installed on the ground at a detecting site (not shown). The detecting site may be installed at or closer to a location with heavy population or important buildings. For example, the acceleration seismometer may be realized by EpiSensor Force Balance Accelerometer (Model FBA ES-T) produced by Kinemetrics, Inc., which detects tiny vibrations on the ground and outputs seismic acceleration signals in axis X, Y and Z. The time interval that the acceleration seismometer measures and outputs the seismic acceleration signals is usually selectable by the system manager. In an embodiment, the suitable measuring and outputting frequency is 200 times per second.

In FIG. 1, the signal preprocessing module 200 includes a filter circuit 210 and an offset removing circuit 220. The filter circuit 210 executes a hardware filtering procedure detecting site on the seismic acceleration signals of the primary wave measured by the installed acceleration seismometer, namely to filter out the environmental noises in the seismic acceleration signals through the filter circuit 210. Such procedure can not only reduce the data volume for analysis, but only increase the analysis accuracy. The offset removing circuit 220 executes a hardware offset-removing procedure on the seismic acceleration signals of the primary wave, namely through the offset removing circuit 220, adjusts and offsets the seismic acceleration signals so that a basic value of each and every seismic acceleration signals returns back to zero. For example, assume an average value of the seismic acceleration signals within a long duration (e.g. 9~11 seconds) as an offset adjusting parameter to adjust and offset the measured seismic acceleration signals.

Figure 4:
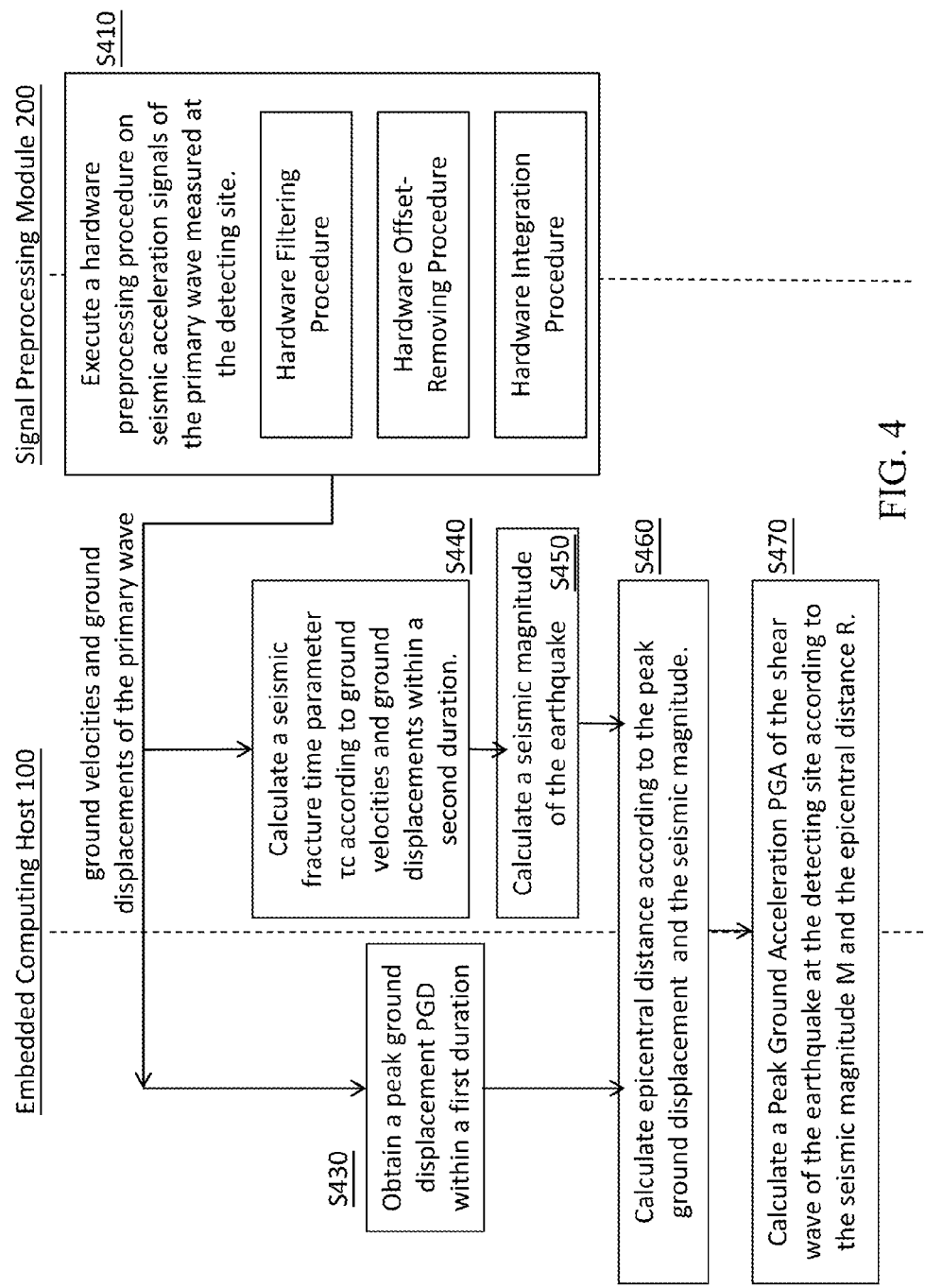
FIG. 4 is a flow chart of a method for on-sit instant seismic analysis according to another embodiment.

In general, the signal preprocessing module 200 receives the seismic acceleration signals of the primary waves measured at the detecting site, and then executes a hardware preprocessing procedure, namely using hardware circuit means to preprocess the seismic acceleration signals of the primary wave before transmitting to the embedded computing host 100. The hardware preprocessing procedure may include a hardware filtering procedure and a hardware offset-removing procedure, or any other signal processing procedures realizable by hardware circuits. However, in the method of the embodiments, the seismic acceleration signals of the primary wave need to be converted into ground velocities and ground displacements of the primary wave, and such procedure needs to execute an integration process on the seismic acceleration signals of the primary wave, so a hardware integration procedure for example, may be combined in the hardware preprocessing procedure of the signal preprocessing module 200 to reduce the computing loading of the embedded computing host 100. Therefore, as shown in FIG. 2, the signal preprocessing module 200 according to another embodiment may further include an integrator circuit 230 to execute the above hardware integration procedure on the seismic acceleration signals of the primary wave; namely executing a hardware integration on the seismic acceleration signals of the primary wave, thereby converting the seismic acceleration signals of the primary wave into the ground velocities and the ground displacements. The following embodiments and FIG. 4 provide more explanations.

In FIG. 1, the embedded computing host 100 includes a computing processor 110, a system memory 120, a storage unit 130, a signal interface 140 and a signal bus 150. After executing the hardware preprocessing procedure on the seismic acceleration signals of the primary wave through the signal preprocessing module 200, the processed seismic acceleration signals are transmitted through the signal interface 140 and the signal bus 150 to be calculated in the computing processor 110. In the present embodiment, the storage unit 130 may store any earthquake information/data, and several necessary algorithm procedures. On the other hand the computing processor 110 of the embedded computing host 100 may load the algorithm procedures to the system memory 120, thereby executing computing operations for various earthquake parameters. The algorithm procedures executed by the computing processor 110 are parts of the method for on-site instant seismic analysis.

In an embodiment, the embedded computing host 100 may be realized by a computer system based on a Disk Operating System (DOS), including MS-DOS produced by Microsoft Corporation or any other suitable versions. An example in an experiment is: using (1) Micro-Box (x86-Based) provided by TeraSoft Inc., and (2) Simulink toolkit provided by MathWorks, Inc. as the developing tools for the algorithm procedures mentioned above.

Micro-Box 3000 provided by TeraSoft Inc. with PCI (Peripheral Component Interconnect) Interface includes the following specifications: Processor: Celeron® M 1 GHz; System memory: 256 MB DDR DRAM; Storage unit: 64 MB Compact Flash card; Bus: Standard PCI bus. In other words, in an embodiment, the hardware part of the embedded computing host 100 may be realized by Micro-Box 3000/TeraSoft.

The Simulink toolkit is a design tool developed by MathWorks for multi-field simulation and modeling of dynamic systems and embedded systems. In an embodiment, the algorithm procedures of the embedded computing host 100 may be edited and drafted by the Simulink toolkit, and then executed on the DOS environment of the Micro-Box system, so as to realize at least a portion of the method for on-site instant seismic analysis. Namely, in such embodiment one or more algorithm procedures need to be executable in the DOS environment, so the computing processor 110 of the embedded computing host 100 is able to execute these DOS-based) algorithm procedures.

In another embodiment, the computing processor of the embedded computing host includes an embedded memory so that through specific firmware editing platform, the algorithm procedures required in the disclosure may be encoded in the firmware of the computing processor, thereby facilitating a firmware-based high-speed computing. In other words, one or more algorithm procedures of the embodiment need to be executed in the firmware environment of the computing processor; namely, in such type of embedded computing host 100, the computing processor 110 is designed to execute the required algorithm procedures in the firmware environment of the computing processor 110. A example utilizes DS1103 PPC Controller Board produced by a Germany dSPACE company. All the algorithm procedures required in the embodiment may be encoded and edited by a Simulink tool software, and then be transferred into machine language and implemented into the firmware of its computing processor PPC 750GX (1 GHz), so as to facilitate a firmware-based high-speed computing.

Regarding to the algorithm procedures executed by the embedded computing host 100, and the method for on-site instant seismic analysis executed by the on-site instant earthquake analyzing system 10, please jointly refer to the following flow charts and corresponding descriptions.

Although the following parts of the method are introduced in sequent steps and flow chart(s), except otherwise limited specifically, the parts of the method do not limited to any certain sequences introduced in the following embodiment.

Figure 3:
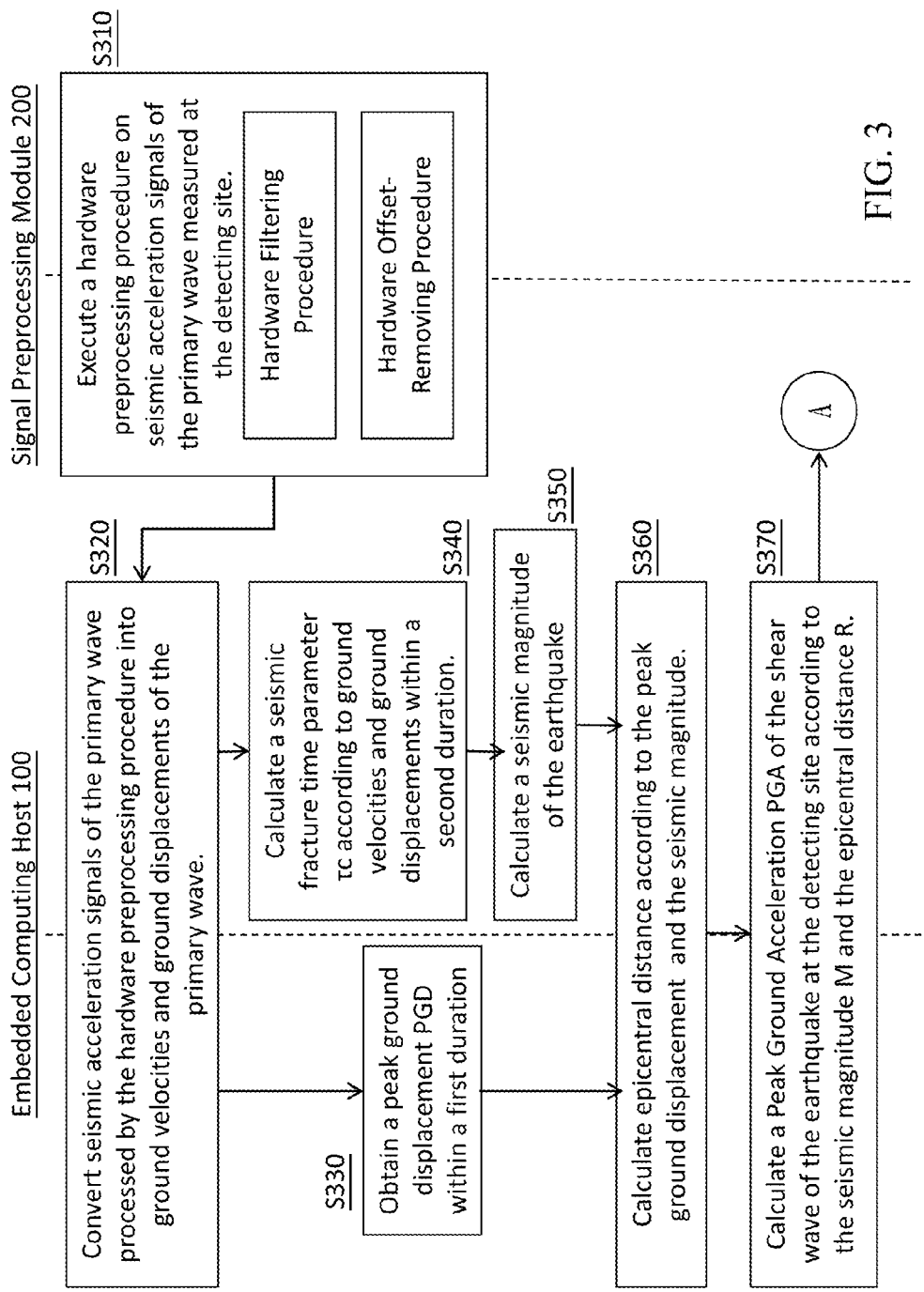
FIG. 3 is a flow chart of a method for on-sit instant seismic analysis according to another embodiment.

Refer to FIG. 3, which is a flow chart of a method for on-sit instant seismic analysis according to another embodiment. Also referring to FIG. 1, in an embodiment, the method for on-site instant seismic analysis includes the following parts:

Step S310: Execute a hardware preprocessing procedure on seismic acceleration signals of the primary wave measured at the detecting site. In the embodiment, the hardware preprocessing procedure includes a hardware filtering procedure and a hardware offset-removing procedure. The filter circuit 210 and the offset removing circuit 220 of the signal preprocessing module 200 respectively process the seismic acceleration signals of the primary wave measured from the earthquake at the detecting site. In another embodiment, a measuring frequency for the seismic acceleration signals of the primary wave is 200 times per second.

The aforesaid part of the method is executed by the signal preprocessing module 200 of the on-site instant earthquake analyzing system. The following part of the method is executed by the computing processor 110 of the embedded computing host 100.

Step S320: Convert the seismic acceleration signals of the primary wave processed by the hardware preprocessing procedure into ground velocities and ground displacements of the primary wave. In the embodiment, also referring to FIG. 2, it would necessary to execute an integration computing procedure through the computing processor 110 of the embedded computing host 100, so as to convert the seismic acceleration signals of the primary wave into the ground velocities and the ground displacements of the primary wave. In the example that processes 200 seismic acceleration signals of the primary wave per second, 200 values for each of the ground velocities and the ground displacements of the primary wave are output correspondingly.

Step S330: Obtain a peak ground displacement (Peak Ground Displacement; PGD) within a first duration. Using the lesser time to obtain the peak ground displacement PGD is extremely important, so the first duration is defined as a duration including at least one peak ground displacement PGD. Since generally the speed of the primary wave is approximately 6-7 km/s (namely the "period" of the primary wave is about 6-7 seconds, the first duration here may be defined as about 3-3.5 seconds. In other words, the first duration may be defined as ½ period of the primary wave. Certainly a longer duration provides more complete data, so the first duration may be defined as a full period of the primary wave at most to obtain the more precise peak ground displacement PGD.

Step S340: Calculate a seismic fracture time parameter τc according to the ground velocities and the ground displacements within a second duration. Provided that the on-site instant earthquake analyzing system is equipped with enough computing capability, the computing loadings of Step S330 and Step S340 need not to be processed in sequence; instead, Steps S330 and S340 may be processed in parallel. The formula of calculating the seismic fracture time parameter τc is:

$$\tau c = \frac{2\pi}{\sqrt{r}}, r = \frac{\int_{t1}^{t2} v^2(t)\,dt}{\int_{t1}^{t2} u^2(t)\,dt},$$ (Formula #1)

wherein v indicates "ground velocity", and u indicates "ground displacement"; both of which are the functions of time "t". "t1" and "t2" are respectively the beginning and ending time for calculation. The formula refers to a journal "Sensors", 2008, titled "Development of an Earthquake Early Warning System Using Real-Time Strong Motion Signals", by Yih-Min Wu and Hiroo Kanamori. In an embodiment, the on-site instant earthquake analyzing system and the method for on-site instant earthquake analysis is designed to continuously calculate seismic fracture time parameter τc without waiting for a determination whether the earthquake is severe enough to be recognized as a seismic event. Such system design saves precious time for analyzing and pre-alarming. Basically, the longer the second duration (namely the interval between Time t1 and t2) is, the more precise data would be obtained. However, meanwhile the pre-alarming timing is postponed and the time for evacuating the crowds is reduced as well. Therefore, in an embodiment, an optimal time interval between Time t2−t1=6-7 seconds, wherein the second duration (namely the time interval between Time t2−t1) is set as the full period of the primary wave. The meaning of Formula #1 is, within the time interval between Time t2−t1, to calculate the square of the ground velocity and divide by the square of the ground displacements, then the square root of which is used as a fraction and times 2π to obtain the seismic fracture time parameter τc.

Step S350: Calculate a seismic magnitude of the earthquake. An example here is to calculate through the seismic fracture time parameter τc with the following formula:

$$M=3.088*\log(\tau c)+5.300$$ (Formula #2)

The seismic magnitude M may be obtained by substituting the seismic fracture time parameter τc calculated in Step S340 into Formula #2. The source of Formula 2 also refers to the "Original Formula" (as listed below) from the journal "Sensors", 2008, titled "Development of an Earthquake Early Warning System Using Real-Time Strong Motion Signals", by Yih-Min Wu and Hiroo Kanamori. However, the Original Formula below is significantly amended into Formula #2 according long time massive experiments.

$$M_w=3.373 \log \tau_c+5.787\pm0.412$$ (Original Formula)

Step S360: Calculate an epicentral distance according to the peak ground displacement and the seismic magnitude. The epicentral distance (R) is defined as the distance between the detecting site (namely where the acceleration seismometer is located) and the epicenter. In an embodiment, the regression formula used to calculate the epicentral distance R is listed as Formula #3 below; the source of Formula #3 refers to a formula introduced by Yih-Min Wu. The epicentral distance R may be obtained by substituting the peak ground displacement PGD calculated in Step S330 and the seismic magnitude M from Formula #2 and Step S350 into Formula #3:

$$\log(PGD)=-3.801+0.722M-1.444*\log(R)$$ (Formula #3)

Step S370: Calculate the PGA (Peak Ground Acceleration) of the shear wave of the earthquake at the detecting site according to the seismic magnitude M and the epicentral distance R. By referring to the Decay Curve Method of Wen-Yu Chien, in the embodiment, Formula #4 below is developed to calculate the peak ground acceleration PGA of the shear wave about to arrive the detecting site. By substituting the seismic magnitude M from Formula #2 and Step S350, and the epicentral distance R from Step S360 into Formula 4, the peak ground acceleration PGA of the shear wave at the detecting site is obtained.

$$PGA=0.00284\exp(1.73306M)[R+0.09994\exp(0.77185M)]^{(-2.06392)}$$ (Formula #4)

According to the data of the peak ground acceleration PGA, the system is about to determine whether an earthquake pre-alarm should be issued for the on-site area at the detecting site; an earthquake intensity at the detecting site may be obtain as well. For example, according the intensity classification in Taiwan, R.O.C., if the peak ground acceleration PGA is in the range of 80-250 gal, that indicates when the shear wave of the earthquake arrives the detecting site, there will be a Level 5 earthquake occurs at the detecting site. The earthquake intensity is Level 6 if the PGA is around 250~400 gal.

Figure 7:
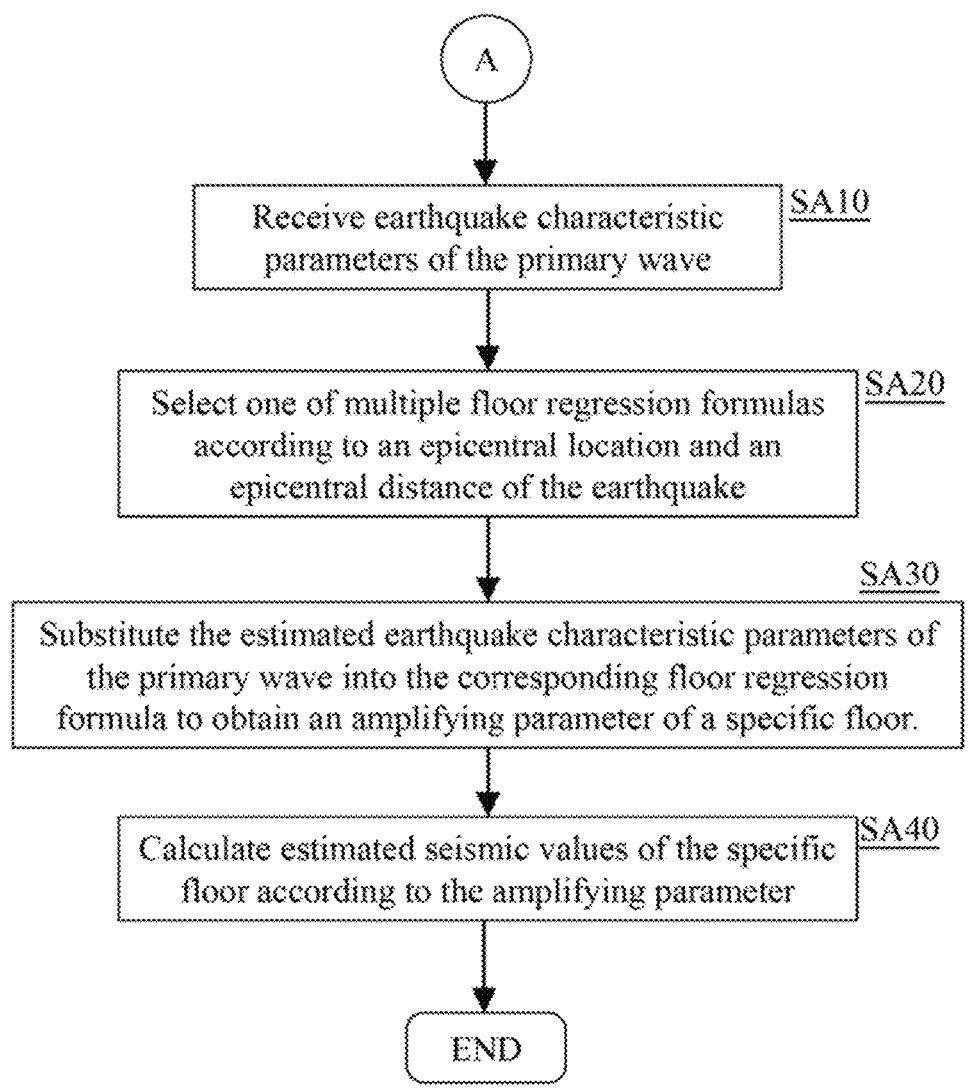
FIG. 7 is a flow chart of a method for on-site instant seismic analysis of a building floor according to another embodiment.

In addition, the seismic data obtained in the method introduced in FIG. 3 may be further utilized for on-site instant seismic analysis of a specific building floor. After Step 370, the method may further execute several steps connected by Step A, as shown in FIG. 3 and FIG. 7. The steps introduced in FIG. 7 will be described in detail in later sections below.

Referring back to FIG. 3 and FIG. 4; FIG. 4 is a flow chart of a method for on-sit instant seismic analysis according to another embodiment. In the embodiment, Steps S430, S440, S450, S460, S470 are similar to Steps S330, S340, S350, S460, and S370 in FIG. 3. The difference is the hardware integration procedure of Step 410. Since the integration computing procedure requires high computing power, time-consuming and resource-consuming processes, the integration computing procedure in the embedded computing host 100 is moved to be executed in the signal preprocessing module 200. The integrator circuit 230 of the signal preprocessing module 200 in FIG. 2 is the module that directly execute the hardware integration procedure. Therefore, the system and the method are about to further accelerate the processing for signals and data.

Figure 5:
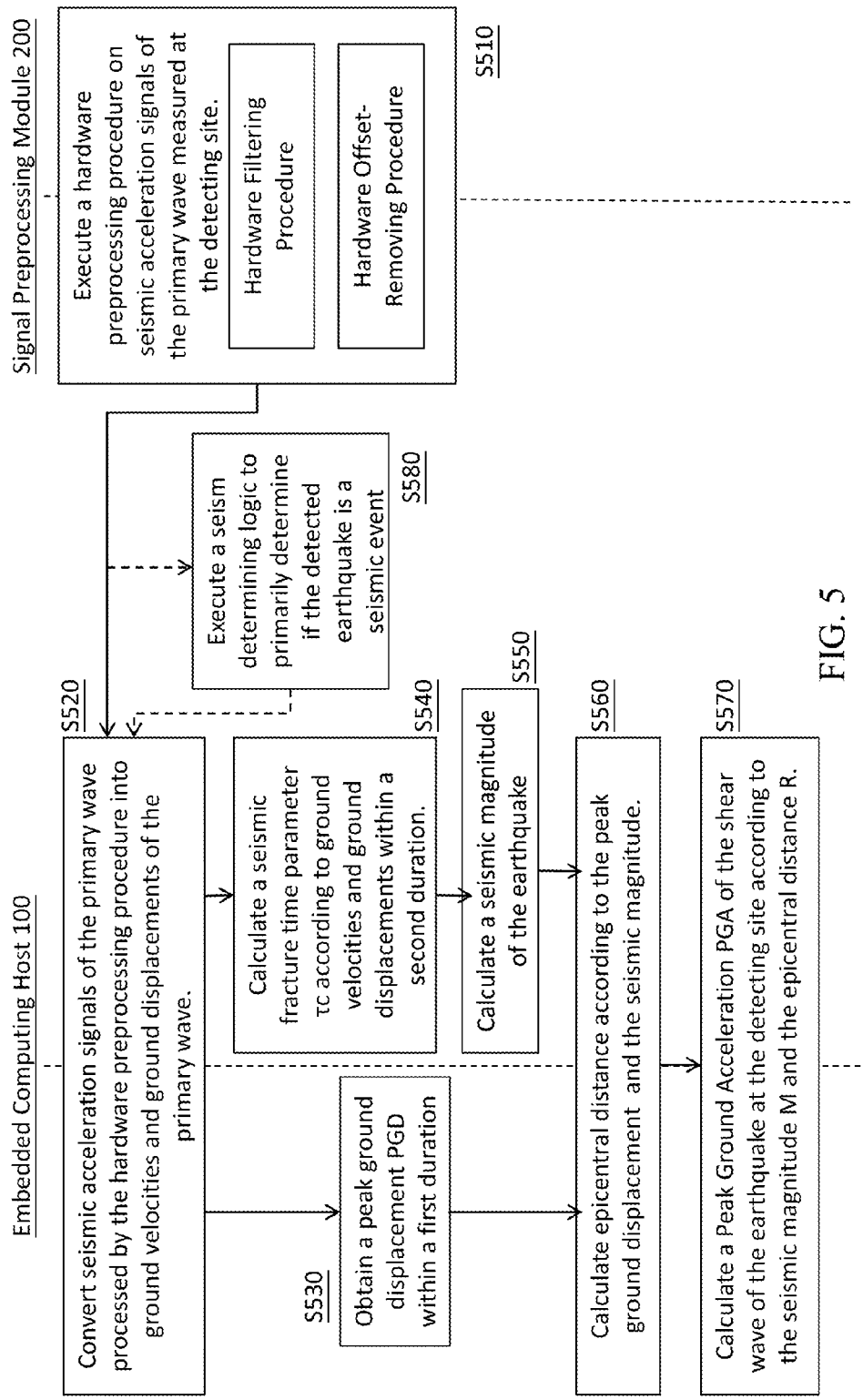
FIG. 5 is a flow chart of a method for on-sit instant seismic analysis according to another embodiment.

Referring to FIG. 5, which is a flow chart of a method for on-sit instant seismic analysis according to another embodiment. In the embodiment, Steps S510, S520, S530, S540, S550, S560, S570 are similar to Steps S310, S320, S330, S340, S350, S360, S370 in FIG. 3. The difference is that in Step S580 in FIG. 5. In Step S580, a seism determining logic is executed to primarily determine if the detected earthquake is a seismic event severe enough to issue a pre-alarm. In difference embodiments, Step S580 may be executed earlier or in parallel to all the other Steps in the embedded computing host 100. Namely, other Steps may be executed or not, depending the result of Step S580. Or, no matter what the result of Step S580 is, other Steps are still executed in parallel.

The seism determining logic in Step S580 may be realized by an Optimized Short Term Averaging over Long Term Averaging Method (Optimized STA/LTA Method).

Refer to the following introduction for the Optimized STA/LTA Method. Firstly, define the seismic acceleration signals into (1) vertical-direction seismic acceleration signals UDn, South-North seismic acceleration signals NSn and East-West seismic acceleration signals EWn. In a data sampling time dT, the Short Term Averaging STA during dT is defined as Formula #5:

$$STA(n) = \frac{\left(\sum_{i=n-m+k}^{n+k} \alpha^i\right)}{m+1},$$

wherein:

$\alpha = [(UD_n - UD_{n-1})^2 + (NS_n - NS_{n-1})^2 + (EW_n - EW_{n-1})^2]^{1/2}$, m is the data amount within the Short Term Averaging STA;

k is averaged data amount of the three-axis seismic acceleration signals UDn, NSn and EWn (n≥1);

and the sampling time Tm for the Short Term Averaging STA is m*dT.

On the other hand, the Long Term Averaging LTA is defined as Formula #6:

$$LTA(n) = \frac{\left(\sum_{i=n-l+k}^{n+k} \beta^i\right)}{l+1}, \quad \text{(Formula #6)}$$

wherein $\beta = [(UD_n - UD_{n-1})^2 + (NS_n - NS_{n-1})^2 + (EW_n - EW_{n-1})^2]^{1/2}$, l is the data amount involved within the Long Term Averaging LTA;

k is averaged data amount of the three-axis seismic acceleration signals UDn, NSn and EWn (n≥1); and the sampling time Tl for the Long Term Averaging LTA is l*dT.

A practical example is to retrieve the seismic acceleration signals of the three axes within the Long Term Averaging LTA (assume Tl is 10 second) and the Short Term Averaging STA (assume Tm is 0.4). Then, obtain the differences of accelerations (seismic acceleration signals) between adjacent sampling points in each and every axis, adding up their squares and obtain the square root thereof, so as to obtain the Long Term Averaging LTA and the Short Term Averaging STA according to their sampling times respectively. When the ratio of the Long Term Averaging LTA and the Short Term Averaging STA reaches a threshold and remains in excess of a monitoring time (assume: 0.05 second), the detected earthquake may be determined as a seismic event. When a seismic event occurs, if the above ratio is smaller than the threshold and remains in excess of a monitoring time (assume: 0.05~10 second), the seismic event is determined as "terminated".

In comparison with the conventional STA/LTA Method, the Optimized STA/LTA Method introduced in the embodiment has been optimized according to verification and observation of the historic data in Taiwan.

Figure 6A:
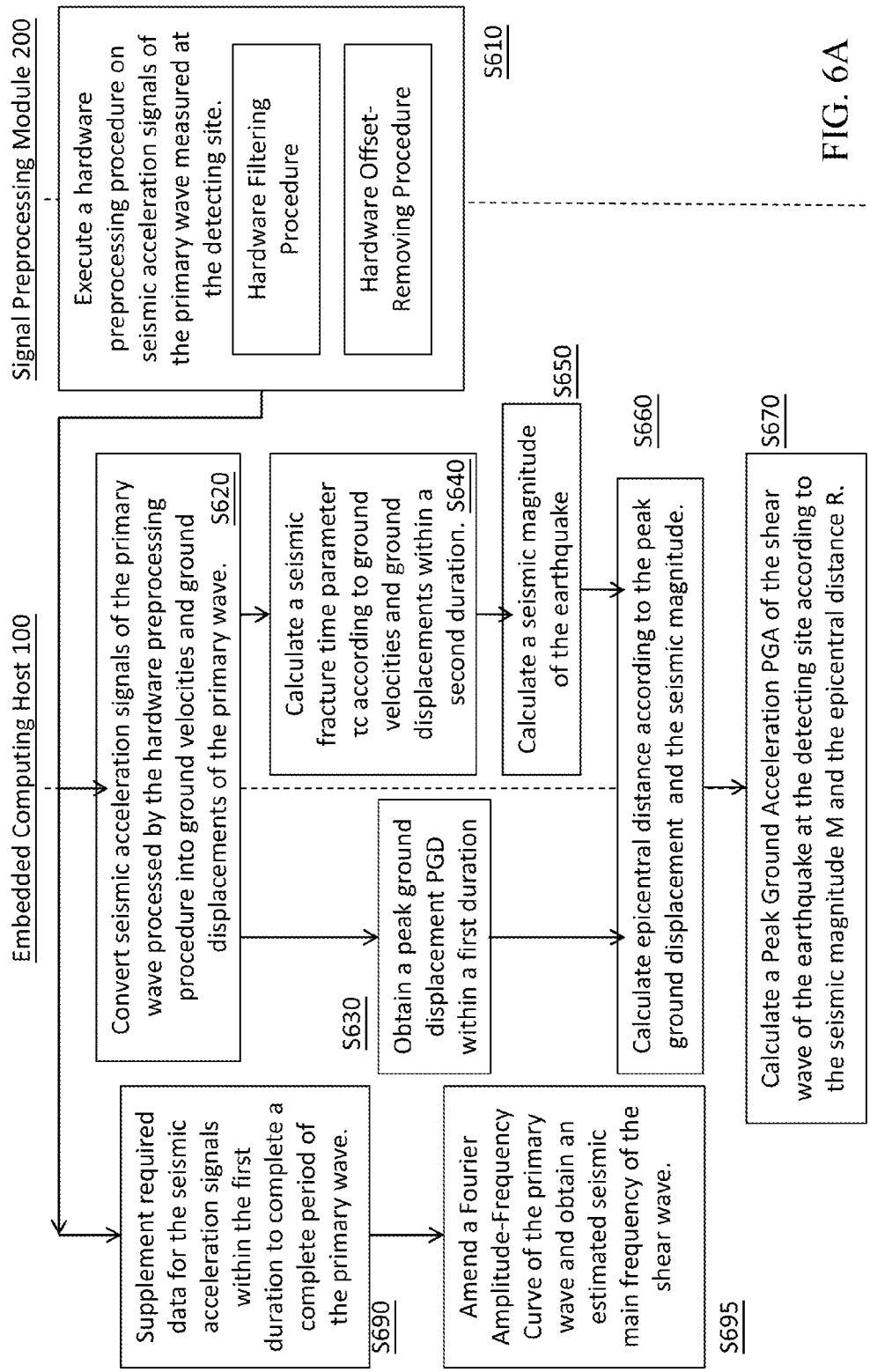
FIG. 6A is a flow chart of a method for on-sit instant seismic analysis according to another embodiment.
Figure 6B:
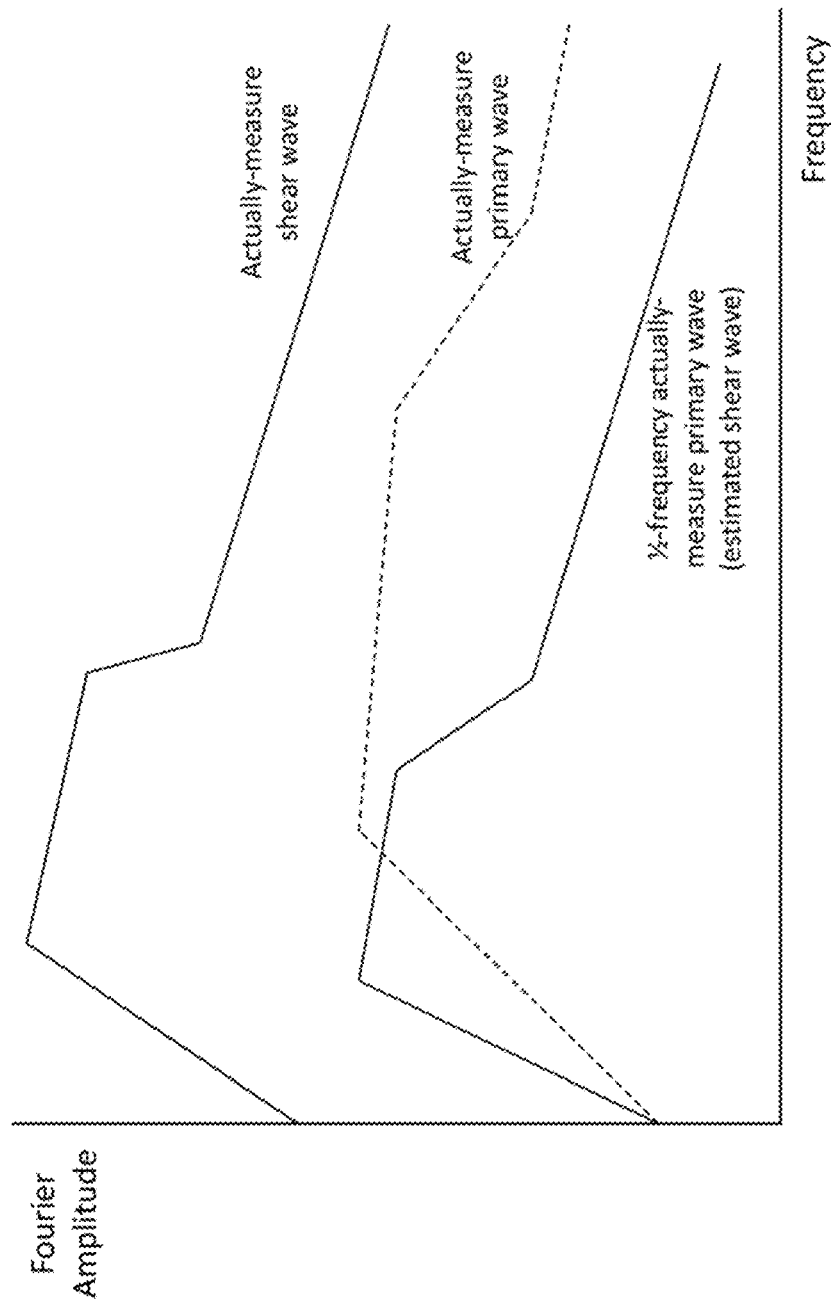
FIG. 6B is a Fourier Amplitude-Frequency Curve of the primary wave and the shear wave according to the embodiment of FIG. 6A.

Refer to FIG. 6A and FIG. 6B, wherein FIG. 6A is a flow chart of a method for on-sit instant seismic analysis according to another embodiment; FIG. 6B is a Fourier Amplitude-Frequency Curve of the primary wave and the shear wave according to the embodiment of FIG. 6A. For the purpose of clear explanations, the detailed waves of the curves in FIG. 6B are flattened.

In FIG. 6A, Steps S610-S680 are similar to Step S310-S380 in FIG. 3. The main difference is Steps S690 and S695. In the embodiment, no matter the ground velocities and the ground displacements are obtained by hardware (integrator circuit) or software (integration computing procedure) processes, the method for on-site instant seismic analysis further includes:

Step 690: Supplement required data for the seismic acceleration signals within the first duration to complete a complete period of the primary wave.

Step 695: Amend a Fourier Amplitude-Frequency Curve of the primary wave and obtain an estimated seismic main frequency of the shear wave. The two steps may be executed by the computing processor 110 of the embedded computing host 100 in the on-site instant earthquake analyzing system.

The method of supplementing required data for the seismic acceleration signals within the first duration to complete a complete period of the primary wave may be realized as follows. If the sampling frequency for the seismic acceleration signals of the primary wave is 200 times per second and the first duration is 3-3.5 seconds, the accumulated data amount are about 600-700. Since the period of the primary wave is usually 6-7 second, the required data amount for a full period would be 1200-1400. A practical method to supplement the data amount is mirroring the seismic acceleration signals within the first duration to supplement the required data for the complete period of the primary wave. In another embodiment, in order to execute the Fourier transform, supplementing the data amount to 1024 is enough for the Fourier transform.

The method of amending Fourier Amplitude-Frequency Curve of the primary wave and obtain an estimated seismic main frequency of the shear wave is: utilizing the Fourier Amplitude-Frequency Curve with a ½ frequency of the primary wave as an estimated Fourier Amplitude-Frequency Curve of the shear wave, so as to obtain the estimated seismic main frequency of the shear wave. Namely, amend the Fourier Amplitude-Frequency Curve of the primary wave into another Fourier Amplitude-Frequency Curve of ½ primary wave; and then use the Fourier Amplitude-Frequency Curve with the ½ frequency of the primary wave as an estimated Fourier Amplitude-Frequency Curve of the shear wave. The reliability of such method is verified by long-time and massive experiments based on historic real data. Refer to FIG. 6B, after amended into ½ frequency from the original Fourier Amplitude-Frequency Curve of actually-measure primary waves (dotted line), the ½-frequency Fourier Amplitude-Frequency Curve for the primary wave, has similar changing trends as the Fourier Amplitude-Frequency Curve of the actually-measured shear wave. Therefore, the ½-frequency Fourier Amplitude-Frequency Curve for the primary wave may be used as the Fourier Amplitude-Frequency Curve of the estimated shear wave, so as to obtain the estimated seismic main frequency of the shear wave.

According to the embodiments mentioned above, the system and method for on-site instant earthquake analysis may further output the estimated seismic main frequency of the shear wave, which is helpful for the responding analysis of buildings.

Figure 8A:
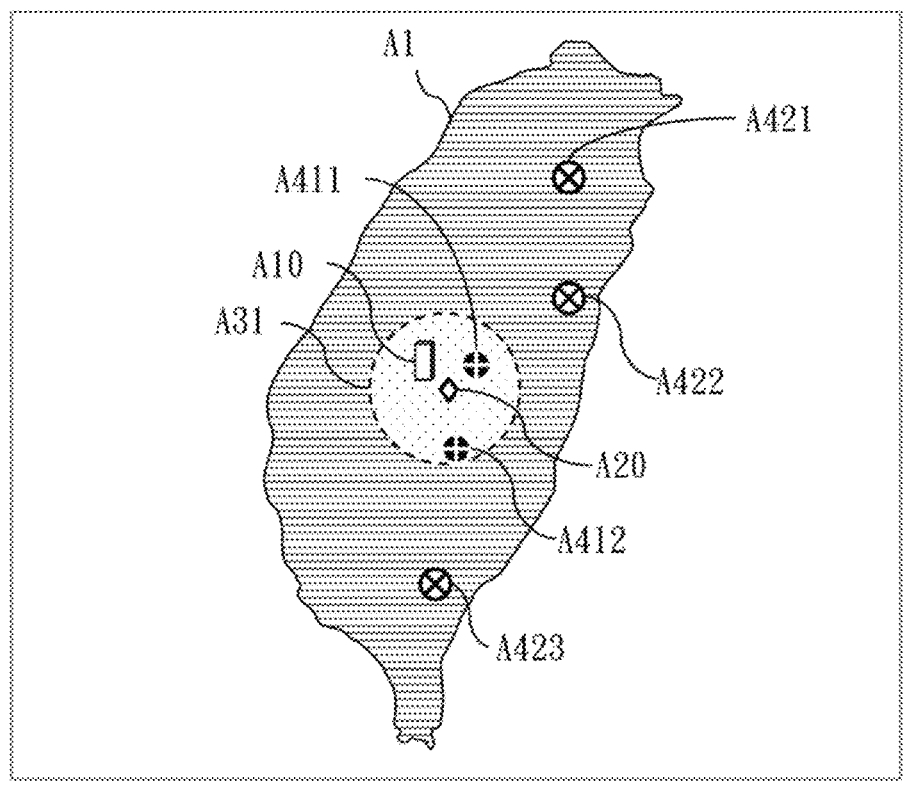
FIG. 8A is a relative-location diagram indicating the geographical locations of a building, a detecting site, an epicentral location and an inland distance threshold during an inland earthquake according to another embodiment.
Figure 8B:
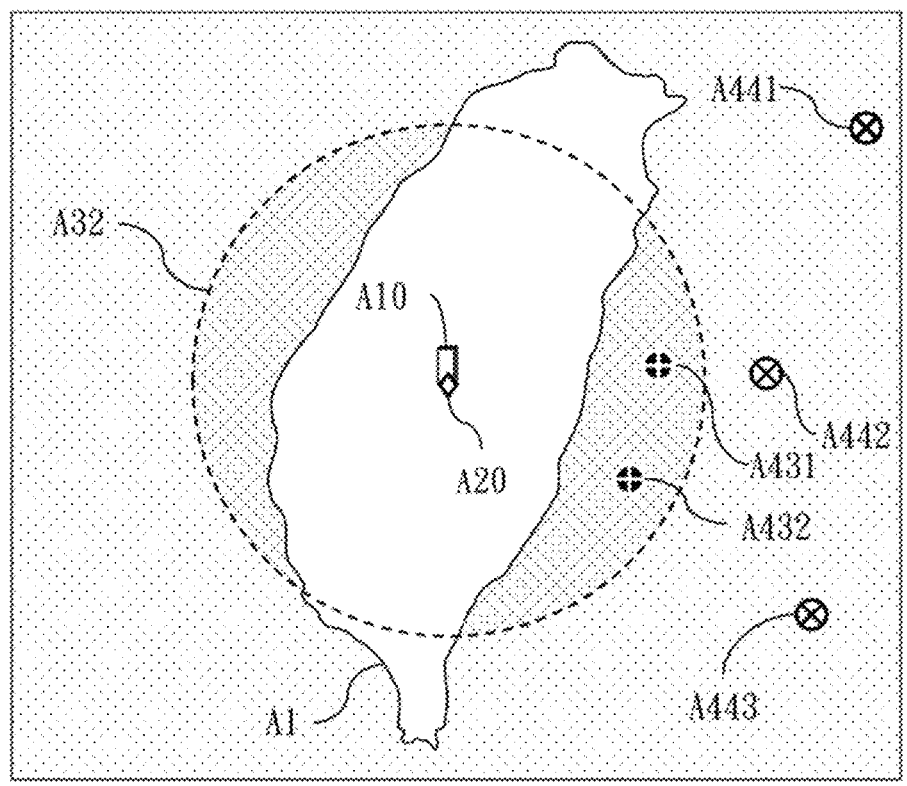
FIG. 8B is a relative-location diagram indicating the geographical locations of a building, a detecting site, an epicentral location and an external-sea distance threshold during an external-sea earthquake according to another embodiment.

Please refer to FIG. 7, which is a flow chart of a method for on-site instant seismic analysis of a building floor according to another embodiment. Please also refer to FIG. 8A and FIG. 8B. FIG. 8A is a relative-location diagram indicating the geographical locations of a building, a detecting site, an epicentral location and an inland distance threshold during an inland earthquake according to another embodiment. FIG. 8B is a relative-location diagram indicating the geographical locations of a building, a detecting site, an epicentral location and an external-sea distance threshold during an external-sea earthquake according to another embodiment.

Step SA10: Receive earthquake characteristic parameters of the primary wave of an earthquake.

A building A10 is located in a middle area of a land A1 (take Taiwan Island as an example). In a detecting site A20 neighboring to or inside the building A10, an acceleration seismometer (as mentioned in the embodiment above) is installed to measure the seismic acceleration signals. In the detecting site 20 a first on-site instant earthquake analyzing system (as mentioned in the embodiment above) may be installed therein. When an earthquake occurs, according to the three-axis seismic acceleration signals of the primary wave measured by the acceleration seismometer, the system analysis and computes several earthquake characteristic parameters, such as an epicentral distance, a peak ground acceleration (PGA), a seismic magnitude, a seismic main frequency, a primary/shear wave time difference. These earthquake characteristic parameters may be actually measured data or computed predicted data, which are used for instant pre-alarm at or around the detecting site. The earthquake characteristic parameters may be utilized as history records for analysis and adjusting the prediction formulas/models or be transmitted to a second on-site instant earthquake analyzing system for further computing or analyzing the response of the building. In difference embodiments, the first and second on-site instant earthquake analyzing systems may be separated or integrated as one hardware system with two sets of software analysis procedures.

Step SA20: Select one of multiple floor regression formulas according to an epicentral location and an epicentral distance of the earthquake.

The floor regression formulas are completed before the earthquake. In short, there may be a specific floor regression formula dedicated prepared for each and every floor in the building A10. The floor regression formula of every floor is firstly obtained as a primary formula by substituting historic earthquake data into a structural dynamic model established for the building A10, and then by verifying and adjusting the formula with long-term historic data and various methods. More details are introduced in the following paragraphs. The floor regression formula of a specific floor may analyze by different regression formulas, for example, "Quadratic Response Surface Models to obtain high accuracy results. The example formula is:

$$y(x) = a_0 + \sum_{i=0}^{N} a_i x_i + \sum_{i<j}^{N} a_{ij} x_i x_j + \sum_{i=0}^{N} a_{ii} x_i^2 + \ldots$$

wherein $y(x)$ is an amplifying parameter. Through the regression analysis of the above, amplifying parameters may be used to correlate (1) the estimated earthquake characteristic parameters according to the primary wave and (2) the regression formulas of floor responses.

Buildings located at different areas or constructed with different structures may have different regression formulas, as well as for each floor of the building. Affected by different on-site geometrical types, ground layers and earthquake transmitting paths, the same earthquake may cause different impacts and damages to the building located in different geometrical areas. Therefore, if the more similar the actual situation is to the historic data used in the regression analysis, a more accurate prediction is obtainable. In the embodiments, the earthquake is classified first according to the epicentral location and the epicentral distance, so as to select a corresponding floor regression formula for further calculation. Therefore, the relative locations between the building, the detecting site and the epicentral location are very important. Since the ground layers of the external-sea area or the inland area are different, which significantly affect the transmission and the sequent damage power of the earthquake, the earthquake needs to be classified into at least two different types and scenarios according to the epicentral location A411/A412/A421/A422/A423/A431/A432/A441/A442/A443. (A) Inland earthquake: As shown in FIG. 8A, the epicentral locations A411/A412/A421/A422/A423 are all located in the inland area of the land A1; in other words, any earthquake with its epicentral location A411/A412/A421/A422/A423 located in the inland area is an inland earthquake. (B) External-sea earthquake: As shown in FIG. 8B, all the epicentral locations A411/A412/A421/A422/A423 are located in the external-sea area to the east of the land A1, so the earthquake generated at the epicentral location A411/A412/A421/A422/A423 are all external-sea earthquake.

Figure 9A:
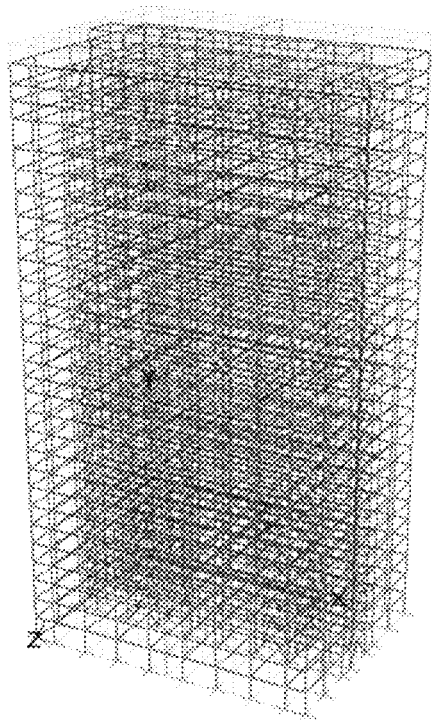
FIG. 9A is an explanatory simulation diagram of the structural dynamic model for the Tai-Power Building under an earthquake with 0 Hz seismic main frequency according to an embodiment.
Figure 9B:
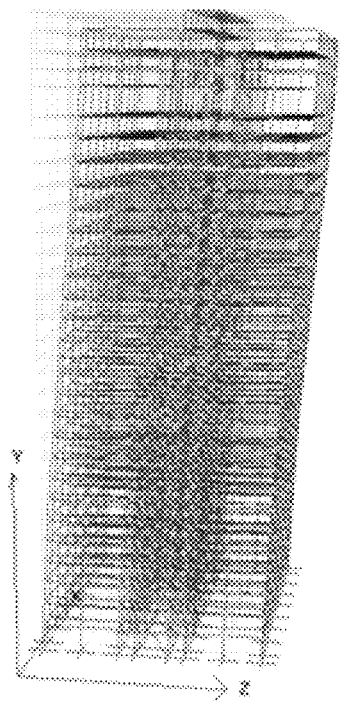
FIG. 9B is an explanatory simulation diagram of the structural dynamic model for the Tai-Power Building under an earthquake with 0.303 Hz seismic main frequency according to an embodiment.
Figure 9C:
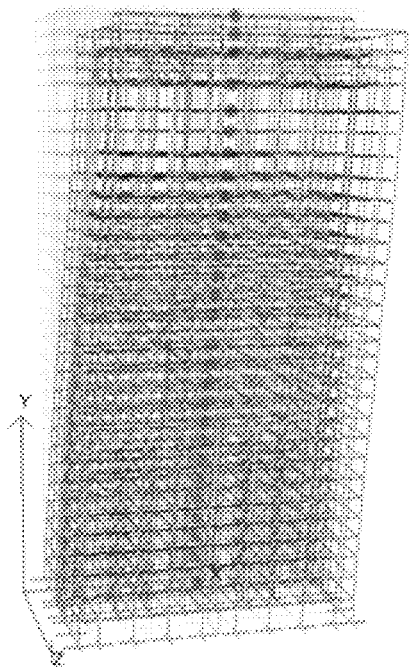
FIG. 9C is an explanatory simulation diagram of the structural dynamic model for the Tai-Power Building under an earthquake with 0.348 Hz seismic main frequency according to an embodiment.
Figure 9D:
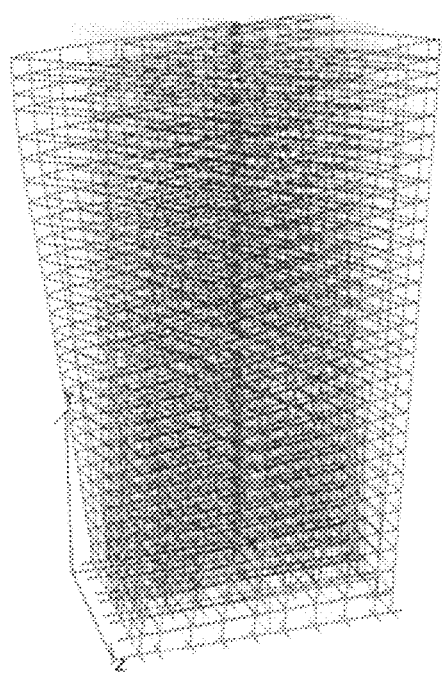
FIG. 9D is an explanatory simulation diagram of the structural dynamic model for the Tai-Power Building under an earthquake with 0.352 Hz seismic main frequency according to an embodiment.
Figure 9E:
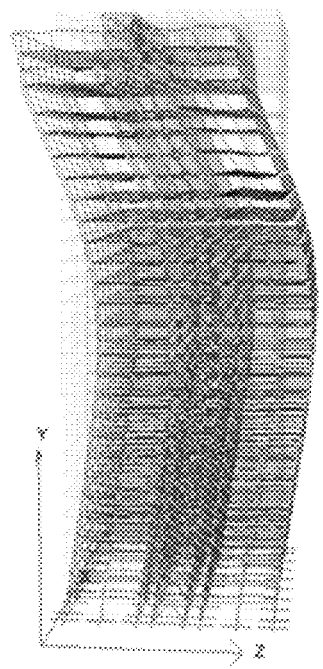
FIG. 9E is an explanatory simulation diagram of the structural dynamic model for the Tai-Power Building under an earthquake with 0.814 Hz seismic main frequency according to an embodiment.
Figure 9F:
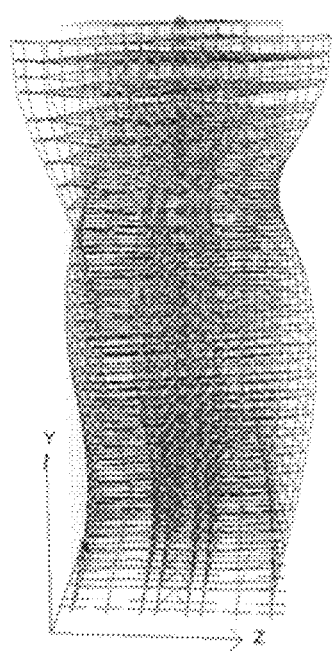
FIG. 9F is an explanatory simulation diagram of the structural dynamic model for the Tai-Power Building under an earthquake with 0.928 Hz seismic main frequency according to an embodiment.
Figure 9G:
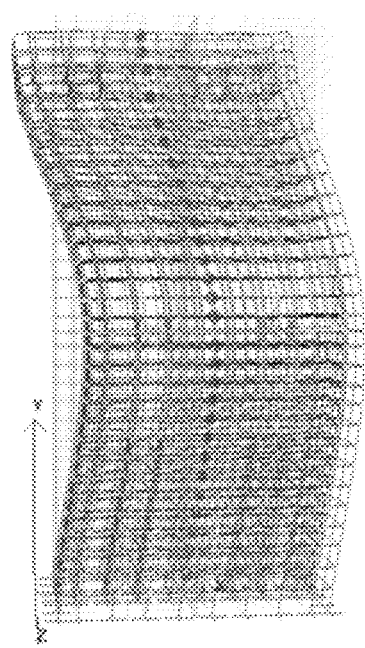
FIG. 9G is an explanatory simulation diagram of the structural dynamic model for the Tai-Power Building under an earthquake with 0.965 Hz seismic main frequency according to an embodiment.
Figure 9H:
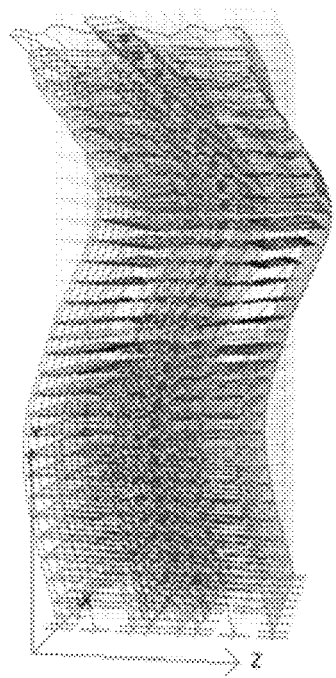
FIG. 9H is an explanatory simulation diagram of the structural dynamic model for the Tai-Power Building under an earthquake with 1.452 Hz seismic main frequency according to an embodiment.
Figure 9I:
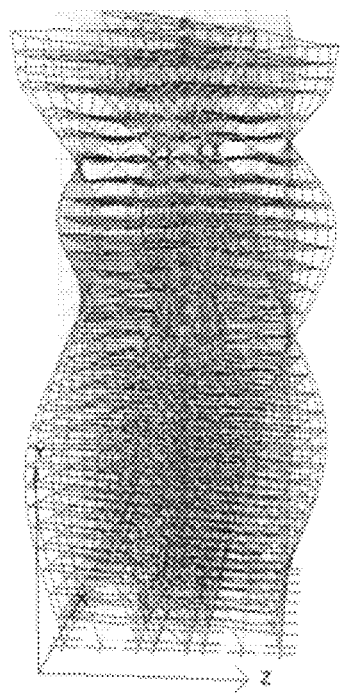
FIG. 9I is an explanatory simulation diagram of the structural dynamic model for the Tai-Power Building under an earthquake with 1.604 Hz seismic main frequency according to an embodiment.
Figure 9J:
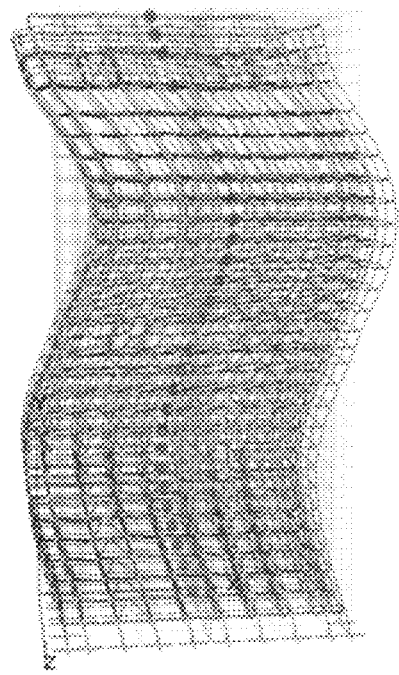
FIG. 9J is an explanatory simulation diagram of the structural dynamic model for the Tai-Power Building under an earthquake with 1.68 Hz seismic main frequency according to an embodiment.

To obtain the floor regression formulas with high accuracy, a structural dynamic model must be established according to the actual building, so as to use the historic earthquake data for further verifications and adjustments. In some embodiments, a structural dynamic model is established through the limitative elements of an actual building (Tai-Power Building located in Taipei City) and simulated by on-site historic data or measured on-site data, as shown in FIG. 9A-9J. FIG. 9A is an explanatory simulation diagram of the Tai-Power Building under 0 Hz seismic main frequency according to an embodiment. When inputting a seismic main frequency 0.303 Hz, the explanatory simulation diagram of the structural dynamic model for Tai-Power Building is shown in FIG. 9B. When inputting a seismic main frequency 0.348 Hz, the explanatory simulation diagram of the structural dynamic model for Tai-Power Building is shown in FIG. 9C. When inputting a seismic main frequency 0.352 Hz, the explanatory simulation diagram of the structural dynamic model for Tai-Power Building is shown in FIG. 9D. When inputting a seismic main frequency 0.814 Hz, the explanatory simulation diagram of the structural dynamic model for Tai-Power Building is shown in FIG. 9E. When inputting a seismic main frequency 0.928 Hz, the explanatory simulation diagram of the structural dynamic model for Tai-Power Building is shown in FIG. 9F. When inputting a seismic main frequency 0.965 Hz, the explanatory simulation diagram of the structural dynamic model for Tai-Power Building is shown in FIG. 9G. When inputting a seismic main frequency 1.452 Hz, the explanatory simulation diagram of the structural dynamic model for Tai-Power Building is shown in FIG. 9H. When inputting a seismic main frequency 1.604 Hz, the explanatory simulation diagram of the structural dynamic model for Tai-Power Building is shown in FIG. 9I. When inputting a seismic main frequency 1.68 Hz, the explanatory simulation diagram of the structural dynamic model for Tai-Power Building is shown in FIG. 9J.

In the prior art, if the instant earthquake characteristic parameters (for a primary wave of an earthquake with its shear wave about to arrive) is input to a building's structural dynamic model established in a conventional system, according to the complexity of the building, it takes tens of minutes or even hours to obtain the seismic data for the floor response of the building. The embodiments are able to obtain the floor seismic data in only seconds with high accuracy by classifying or differentiating an earthquake into difference earthquake scenarios. According to earthquake scenarios, the instant earthquake data may be substituted into a corresponding one of the floor regression formulas to obtain accurate results shortly. And the floor regression formulas are obtained and verified by substituting the on-site historic seismic data into the structural dynamic model so as to adjust and achieve the high accuracy.

In addition, in the embodiments related to FIG. 8A and FIG. 8B, an inland distance threshold A31 and an external-sea distance threshold A32 are respectively highlighted. According to the experimental results from historic data, the inland earthquakes with an epicentral distance less than or in excess of the inland distance threshold A31 have more different earthquake characteristic parameters. The inland earthquakes with an epicentral distance less or in excess of the inland distance threshold A31 also cause different effects or damages to the building A1. Therefore inland earthquakes may be classified into: (1) epicentral location A411/A412: located in the inland area and the epicentral distance is less than inland distance threshold A31; and (2) epicentral location A421/A422/A423: located in the inland area with the epicentral distance in excess of the inland distance threshold A31. Similarly, according to the experimental results from historic data, the external-sea earthquakes with the epicentral distance less than or in excess of the external-sea distance threshold A32 cause different effects or damages to the building A1 and also have major differences in their earthquake characteristic parameters. Therefore, the external-sea earthquake may be further classified into: (1) epicentral location A431/A432: located in the external-sea area (outside the inland area) with its epicentral distance less than the external-sea distance threshold A32; and (2) epicentral location A441/A442/A443: located in the external-sea area (outside the inland area) with its epicentral distance in excess of the external-sea distance threshold A32.

In other words, for a specific floor in the building A1, four floor regression formulas may be obtained corresponding to four different earthquake scenarios, which are: (1) located in the inland area with its epicentral distance less than the inland distance threshold; (2) located in the inland area with its epicentral distance in excess of the inland distance threshold; (3) located in the external-sea area with its epicentral distance less than the external-sea distance threshold; and (4) located in the external-sea area with its epicentral distance in excess of the external-sea distance threshold.

Step SA30: Substitute the estimated earthquake characteristic parameters of the primary wave into the corresponding floor regression formula to obtain an amplifying parameter of a specific floor.

Take the earthquake occurs at the epicentral location A422 in FIG. 8A. The earthquake is classified into the earthquake scenario (2), namely located in the inland area with its epicentral distance in excess of the inland distance threshold. Substitute the earthquake characteristic parameters of the primary wave into the floor regression formula corresponding to the earthquake scenario (2), so as to obtain the amplifying parameter of the specific floor. The amplifying parameter may be defined as a ratio of a predicted peak acceleration at the specific floor (ex. 10 F) and the peak ground acceleration PGA when the primary wave of the earth earthquake arrives the building. More descriptions are provided in the following paragraphs.

Step SA40: Calculate estimated seismic values of the specific floor according to the amplifying parameter.

After obtain the amplifying parameter of the specific floor according to the floor regression formula, the estimated seismic values of the specific floor may be further calculated. The estimated seismic values may include a predicted peak acceleration of the specific floor, or a predicted seismic intensity of the specific floor calculated from the predicted peak acceleration. The estimated seismic values may be used as reference from the authority of the building A1 to issue an earthquake pre-alarm according planned disaster evacuating procedure or damage control procedures. The crowds at the specific floor with the predicted seismic intensity higher than a caution range may be cautioned in advance for early evacuation to avoid or reduce injuries or death.

As mentioned above, in the process of the regression analysis, it is important to continuously improve the floor regression formula corresponding to the specific floor. One approach is to substitute the historic earthquake data according to the earthquake scenario.

Earthquake scenario (1): Use the historic earthquake data in Table 1, in which the earthquakes were located in the inland area (Taiwan Middle Area) with it epicentral distance less than the inland distance threshold, substituting into the primary floor regression formula and into the structural dynamic model. In some embodiments, a suitable inland distance threshold may be 30±5 kilometers. In Tablet 1, a predicted peak ground acceleration PGA may be calculated from the earthquake characteristic parameters of the primary wave arrived the building (refer to the method introduced in the embodiments above and FIG. 3-6A. Assuming the predicted peak ground acceleration PGA is the same as the actually measured PGA, substitute the predicted peak ground acceleration PGA into the primary floor regression formula to obtain a predicted amplifying parameter and a predicted peak acceleration of the specific floor. Input the same predicted peak ground acceleration PGA in to the verified structural dynamic model, and then through the simulation of the model, the simulated peak floor acceleration PFA of the specific floor (i.e. top floor) may be obtained. Compare the predicted peak acceleration and the actually measured peak ground acceleration PGA (or simulated peak ground acceleration PGA obtained from the structural dynamic model), revise the primary floor regression formula, and then the floor regression formula is getting more accurate. Inputting the historic earthquake data that match the earthquake scenario and revising the corresponding floor regression formula can obtain the more accurate results accordingly.

TABLE 1

Inland Earthquake with epicentral distance less than 30 km

| Date/ Time | Epicenter Coordinates Longitude | Epicenter Coordinates Latitude | Epicentral Distance (km) | Earthquake Magnitude | Ground PGA | Top Floor PFA | Amplifying Parameter | Ground Intensity | Top Floor Intensity |
|---|---|---|---|---|---|---|---|---|---|
| 1994 Apr. 6 09:44 | 120.421 | 23.533 | 6.6 | 5.3 | 83.44 | 199 | 2.38495 | 5 | 5 |
| 1994 Jan. 3 17:24 | 120.535 | 23.41 | 18.3 | 4.4 | 15.31 | 32.36 | 2.11365 | 3 | 4 |

Earthquake scenario (2): Similarly, respectively substituting the historic earthquake data in Table 2, in which the 15 earthquakes were located in the inland area (Taiwan Middle Area) with their epicentral distances in excess of the inland distance threshold, into the primary floor regression formula and inputting into the structural dynamic model, can gradually improve the floor regression formula corresponding to the earthquake scenario (2).

TABLE 2

Inland Earthquake (Taiwan Middle Area)/epicentral distance exceeding 30 km

| Date/ Time | Epicenter Coordinates Longitude | Epicenter Coordinates Latitude | Epicentral Distance (km) | Earthquake Magnitude | Ground PGA | Top Floor PFA | Amplifying Parameter | Ground Intensity | Top Floor Intensity |
|---|---|---|---|---|---|---|---|---|---|
| 1994 Jun. 1 00:00 | 120.77 | 23.715 | 34.4 | 4.57 | 13.99 | 19.36 | 1.38385 | 3 | 3 |
| 1993 Dec. 16 06:04 | 120.524 | 23.213 | 39.4 | 5.7 | 29.15 | 73.54 | 2.52281 | 4 | 4 |
| 1994 Mar. 28 16:37 | 120.687 | 22.985 | 68 | 5.41 | 8.17 | 16.21 | 1.98409 | 3 | 3 |
| 1994 Sep. 21 03:48 | 120.982 | 23.142 | 69.9 | 5.01 | 6.77 | 10.54 | 1.55687 | 2 | 3 |

Earthquake scenario (3): Similarly, respectively substituting the historic earthquake data in Table 3, in which the earthquakes were located in the external-sea area (the external sea to the east of Taiwan Island) with their epicentral distances less than the inland distance threshold, into the primary floor regression formula and inputting into the structural dynamic model, can gradually improve the floor regression formula corresponding to the earthquake scenario (3). In some embodiments, the suitable external-sea distance threshold may be 160±5 kilometers.

TABLE 3

External-sea Earthquake with epicentral distance less than 160 km

| Date/ Time | Epicenter Coordinates Longitude | Epicenter Coordinates Latitude | Epicentral Distance (km) | Earthquake Magnitude | Ground PGA | Top Floor PFA | Amplifying Parameter | Ground Intensity | Top Floor Intensity |
|---|---|---|---|---|---|---|---|---|---|
| 1994 Oct. 5 09:17 | 121.72 | 23.156 | 135.1 | 5.83 | 13.44 | 32.47 | 2.41592 | 3 | 4 |
| 1994 Oct. 30 04:00 | 121.776 | 24.049 | 143 | 4.93 | 5.32 | 11.31 | 2.12594 | 2 | 3 |
| 1994 Jan. 20 14:32 | 120.852 | 24.065 | 150.9 | 5.58 | 70.61 | 90.85 | 1.28664 | 4 | 5 |
| 1993 Dec. 3 08:15 | 121.824 | 24.285 | 158.9 | 5.35 | 13.45 | 28.29 | 2.10335 | 3 | 4 |

Earthquake scenario (4): Similarly, respectively substituting the historic earthquake data in Table 3, in which the earthquakes were located in the external-sea area (the external sea to the east of Taiwan Island) with their epicentral distances in excess of the inland distance threshold, into the primary floor regression formula and inputting into the structural dynamic model, can gradually improve the floor regression formula corresponding to the earthquake scenario (4).

TABLE 4

External-sea Earthquake with epicentral distance in excess of 160 km

| Date/ Time | Epicenter Coordinates Longitude | Epicenter Coordinates Latitude | Epicentral Distance (km) | Earthquake Magnitude | Ground PGA | Top Floor PFA | Amplifying Parameter | Ground Intensity | Top Floor Intensity |
|---|---|---|---|---|---|---|---|---|---|
| 1994 Jun. 5 09:09 | 121.838 | 24.462 | 170.8 | 6.5 | 15.59 | 30.95 | 1.98525 | 3 | 4 |
| 1994 Sep. 15 15:07 | 122.204 | 23.622 | 176.5 | 5.31 | 6.4 | 7.42 | 1.15938 | 2 | 2 |
| 1994 May 24 12:59 | 121.603 | 23.827 | 218.9 | 6.6 | 12.09 | 15.39 | 1.27295 | 3 | 3 |
| 1994 May 24 00:15 | 122.636 | 23.863 | 222.7 | 6 | 9.61 | 16.95 | 1.76379 | 3 | 3 |

The structural dynamic model of the building may be rectified by Ambient Vibration Measurements, thereby facilitating the vibration responses of the structural dynamic model more matching the actual responses of the building, and also make the floor regression formulas more accurate. Aside from using the historic earthquake data and rectifying the structural dynamic model, the following embodiments use an actually constructed structural vibration platform for further verifications and experiments of difference regression analysis models, or for obtaining more accurate floor regression formulas.

Figure 10A:
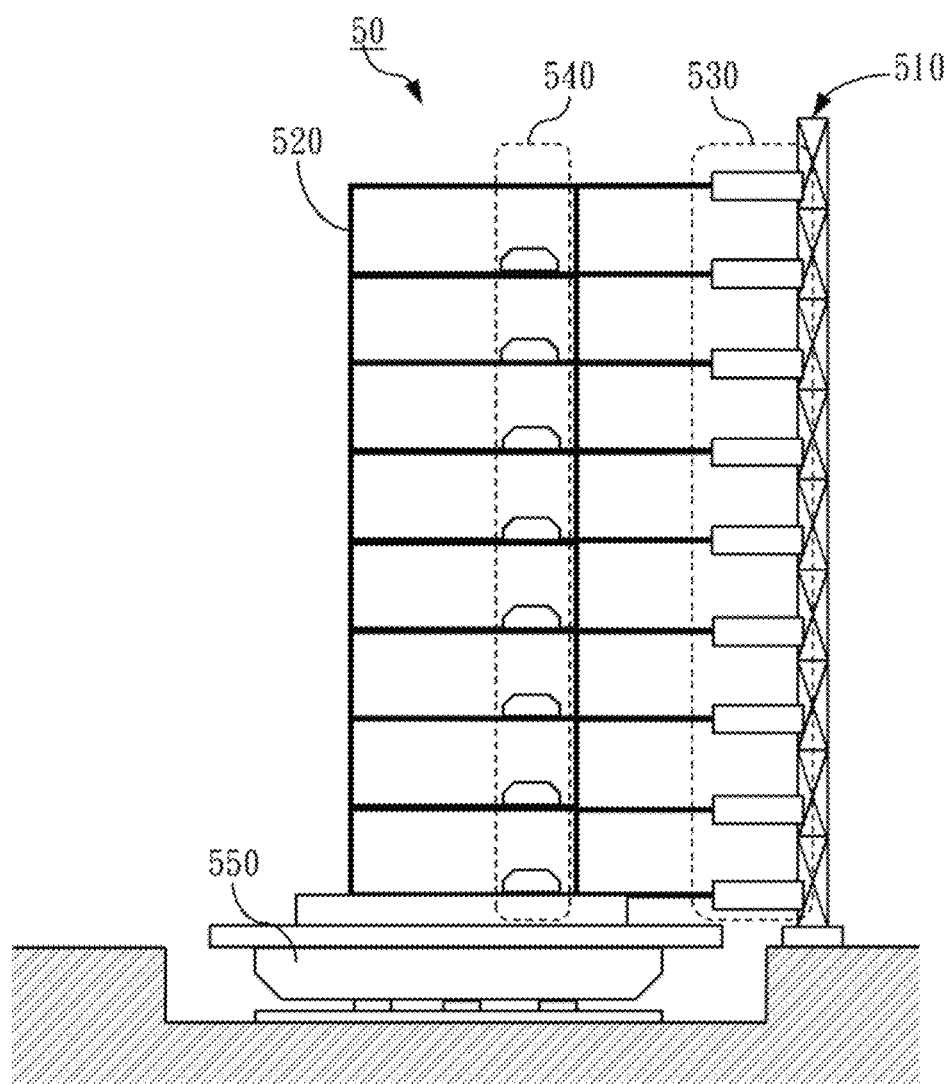
FIG. 10A is an explanatory diagram of a structural vibration platform for verifying the floor regression formulas according to another embodiment.

Refer to FIG. 10A, which is an explanatory diagram of a structural vibration platform for verifying the floor regression formulas according to another embodiment. Structural vibration platform A50 includes a reference framework A510 and a testing framework A520. The testing framework A520 is an 8-floor simulative building, with each and every floor respectively connected with the reference framework 510 and installed with a displacement meter A530. In the meantime, every floor of the testing framework A520 is installed with an acceleration meter A540. During the experiments, the testing framework A520 is driven by vibration platform A550 to simulate the vibration responses during a real earthquake. The amplifying parameter obtained by the floor regression formula, may be compared with the amplifying parameter calculated from the measured data of the displacement meter A530 and the acceleration meter A540.

According to the embodiment shown in FIG. 10A, the obtained floor regression formulas are:

(1) $4^{th}$ Floor:

$$Amp_4 = 2.35172 - 4.832 \times 10^{-3} D + 1.597 \times 10^{-3} P - 3.527 \times 10^{-5} DP + 6.017 \times 10^{-5} D^2 - 2.996 \times 10^{-6} P^2$$

(2) $8^{th}$ Floor:

$$Amp_8 = 2.72958 + 1.142 \times 10^{-7} D + 2.44 \times 10^{-3} P - 5.423 \times 10^{-5} DP + 5.795 \times 10^{-5} D^2 - 3.411 \times 10^{-6} P^2$$

Amp is the predicted amplifying parameter of the specific floor; D is the epicentral distance; P is the peak ground acceleration PGA (gal). In the embodiment, the estimated earthquake characteristic parameters of the primary wave substituted into floor regression formula are the peak ground acceleration PGA and the epicentral distance D of the earthquake.

Figure 10B:
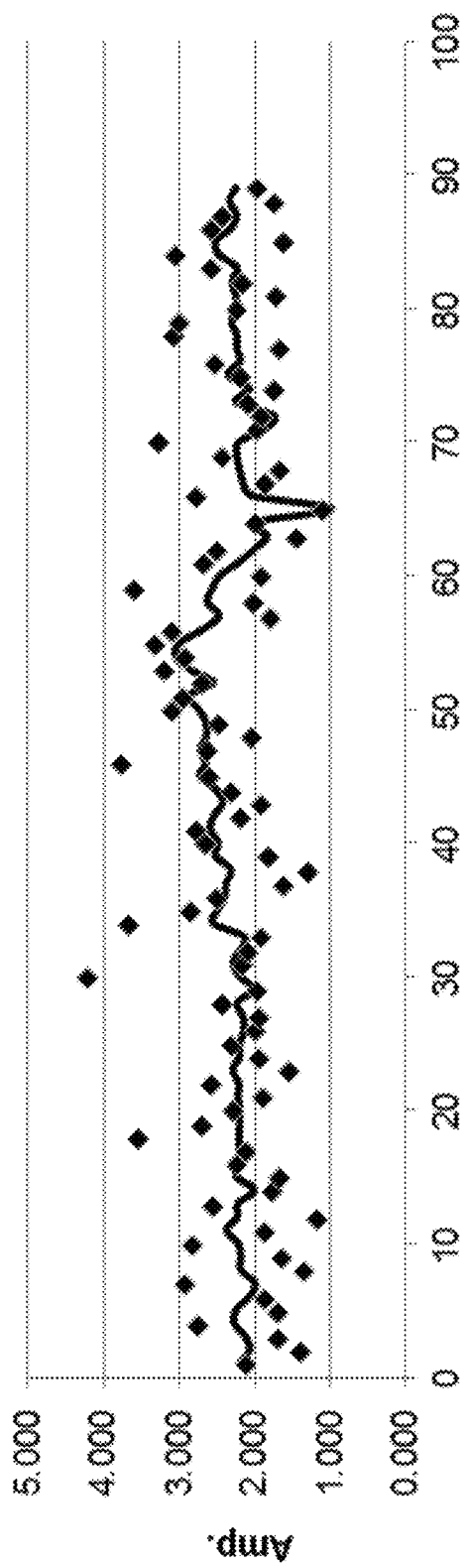
FIG. 10B is an amplifier-time diagram for the $4^{th}$ floor of the structural vibration platform according another embodiment.
Figure 10C:
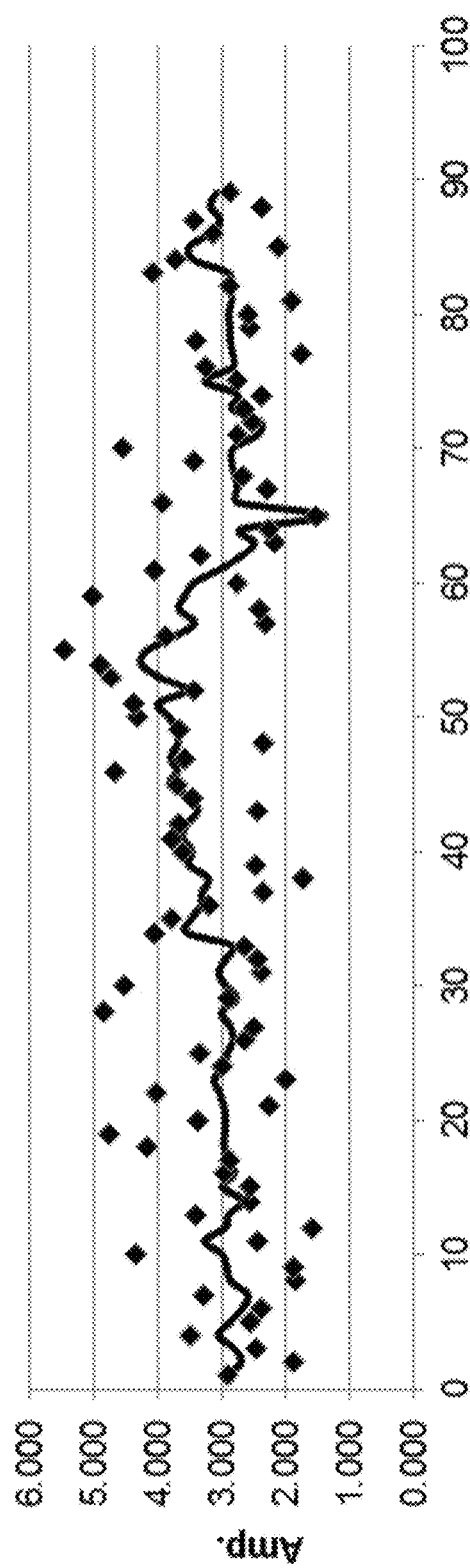
FIG. 10C is an amplifier-time diagram for the $8^{th}$ floor of the structural vibration platform according another embodiment.

Some experiment data are shown in FIG. 10B and FIG. 10C, Table 5 and Table 6. FIG. 10B is an amplifier-time diagram for the $4^{th}$ floor of the structural vibration platform according another embodiment, which illustrates the actually measured amplifying parameters (Dots) and the ones from the floor regression formula (Continuous Line). FIG. 10B is an amplifier-time diagram for the $8^{th}$ floor of the structural vibration platform according another embodiment, which illustrates the actually measured amplifying parameters (Dots) and the ones from the floor regression formula (Continuous Line). According to the experiment results, in average there is more than 80% accuracy. By using such short-term data of the primary wave, such results are accurate enough for issuing a pre-alarm and saving people.

TABLE 5

Pick Acceleration and Floor Intensity at 4F

| | 4F Pick Acceleration | 4F Predicted Pick Acceleration | Actual Intensity | Predicted Intensity |
|---|---|---|---|---|
| CHY004 | 212.66 | 217.91 | 5 | 5 |
| CHY104 | 168.56 | 197.09 | 5 | 5 |
| HAW006 | 233.24 | 203.49 | 5 | 5 |
| ILA051 | 260.68 | 236.37 | 6 | 5 |
| TAP008 | 362.6 | 376.34 | 6 | 6 |
| TAP020 | 368.48 | 314.31 | 6 | 6 |
| TAP051 | 408.66 | 404.96 | 6 | 6 |
| TCU071 | 180.32 | 209.76 | 5 | 5 |
| TCU138 | 247.94 | 204.29 | 5 | 5 |

TABLE 6

Pick Acceleration and Floor Intensity at 8F

| | 8F Pick Acceleration | 8F Predicted Pick Acceleration | Actual Intensity | Predicted Intensity |
|---|---|---|---|---|
| CHY004 | 325.36 | 309.85 | 6 | 6 |
| HAW006 | 264.6 | 270.90 | 6 | 6 |
| ILA030 | 312.62 | 389.00 | 6 | 6 |
| ILA051 | 390.04 | 347.12 | 6 | 6 |
| TAP008 | 642.88 | 580.32 | 6 | 6 |
| TAP020 | 465.5 | 461.90 | 6 | 6 |
| TAP051 | 622.3 | 661.22 | 6 | 6 |
| TCU138 | 339.08 | 268.59 | 6 | 6 |

Figure 11:
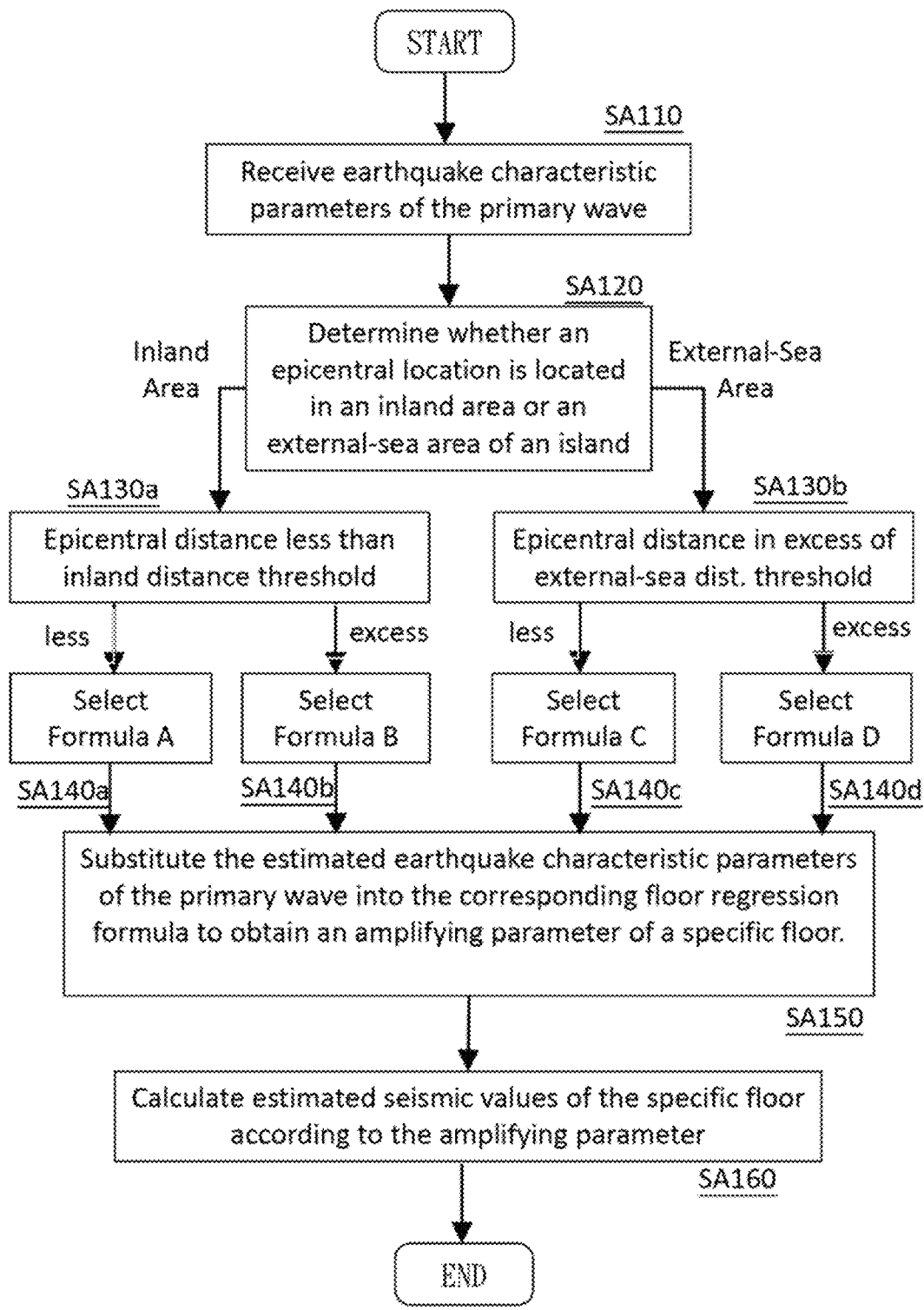
FIG. 11 is a flow chart of a method for on-site instant analysis of a specific building floor according to another embodiment.

Referring to FIG. 11, which is a flow chart of a method for on-site instant analysis of a specific building floor according to another embodiment. Steps SA110, SA150, SA160 are respectively similar to the Step SA10, SA30 and Step SA40 in FIG. 7, so related descriptions are omitted here. The difference between FIG. 7 and FIG. 11 is that, in FIG. 11 the Step SA120 and Step SA140a/SA140b/SA140c/SA140d clearly introduce, that how the Step SA20 realized the step of "select one of multiple floor regression formulas according to an epicentral location and an epicentral distance of the earthquake".

Step SA120: Determine whether an epicentral location of the earthquake is located I the inland area or the external-sea area. According locating within the inland area or the external-sea area, respective proceed with Step SA130a and SA130b.

Step SA130a: Determine whether the epicentral distance of the inland earthquake is less than or in excess of the inland distance threshold.

Step SA130b: Determine whether the epicentral distance of the external-sea earthquake is less than or in excess of the external-sea distance threshold.

As mentioned in the above embodiments, after determine the corresponding earthquake scenario according to the epicentral distance of the earthquake, the system/method selects the corresponding one among the floor regression formulas A/B/C/D along Steps SA140a/SA140b/SA140c/SA140d.

Step SA150: Substitute the estimated earthquake characteristic parameters (such as peak ground acceleration PGA) of the primary wave into the selected corresponding floor regression formula to obtain an amplifying parameter of a specific floor.

Step SA160: Calculate estimated seismic values (such as predicted peak acceleration or predicted seismic intensity) of the specific floor according to the amplifying parameter.

The required system for executing the method introduced in FIG. 7 and FIG. 11 would be similar to the Embedded Computing Host 100 in FIG. 1 or 2. Sure a X86 system is possible to perform the steps and fulfill the instant analysis requirements of the embodiment. The estimated earthquake characteristic parameters of the primary wave may be selected from the group consisting of an epicentral distance, a peak ground acceleration (PGA), a seismic magnitude, a seismic main frequency and primary/shear wave arrival time difference or any combination thereof.

Although in FIG. 8A, 8B only one detecting site is mentioned, the system and methods of the embodiments above are not generally limited to process earthquake characteristic parameters from a single detecting site. Furthermore, generally the epicentral distance is the distance between the epicentral location and a detecting site established neighboring or inside the building.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A system for on-site instantly analyzing a primary wave of an earthquake measured at a detecting site to predict a shear wave of the earthquake about to arrive at the detecting site, the system comprising:

a signal preprocessing module, receiving a plurality of seismic acceleration signals of the primary wave measured at the detecting site and executing a hardware preprocessing procedure on the seismic acceleration signals; and an embedded computing host, receiving the seismic acceleration signals preprocessed by the signal preprocessing module to calculate a peak ground acceleration (PGA) of the shear wave;

wherein, after the hardware preprocessing procedure, the seismic acceleration signals are converted into a plurality of ground velocities and ground displacements of the primary wave, to obtain a peak ground displacement within a first duration;

wherein the embedded computing host further calculates a seismic fracture time parameter according to the ground velocities and the ground displacements within a second duration, thereby calculating a seismic magnitude of the earthquake at the detecting site;

wherein the embedded computing host further calculates an epicentral distance according to the peak ground displacement and the seismic magnitude, and then calculates the peak ground acceleration of the shear wave at the detecting site according to the seismic magnitude and the epicentral distance;

wherein the system compares the data of the peak ground acceleration PGA with a predetermined intensity classification, and issues an earthquake pre-alarm for the on-site area at the detecting site if the system determines that the data of the peak ground acceleration PGA exceeds the predetermined intensity classification, thereby triggering a disaster evacuating procedure or a damage control procedure.

2. The system according to claim 1, wherein the signal preprocessing module comprises a filter circuit and an offset removing circuit, the filter circuit executing a hardware filtering procedure on the seismic acceleration signals, and the offset removing circuit executing a hardware offset-removing procedure on the seismic acceleration signals.

3. The system according to claim 1, wherein the signal preprocessing module comprises an integrator circuit, the integrator circuit executing a hardware integration procedure on the seismic acceleration signals, to convert the seismic acceleration signals into the ground velocities and the ground displacements of the primary wave.

4. The system according to claim 1, wherein the embedded computing host executes an integration computing procedure to convert the seismic acceleration signals into the ground velocities and the ground displacements of the primary wave.

5. The system according to claim 1, wherein the embedded computing host comprises at least a computing processor, the computing processor executing at least an algorithm procedure in the environment of a firmware on the computing processor or a disk operation system to analyze the earthquake.

6. A method for on-site instantly analyzing a primary wave of an earthquake measured at a detecting site to predict a shear wave of the earthquake about to arrive at the detecting site, the method comprising:

executing a hardware preprocessing procedure on a plurality of seismic acceleration signals of the primary wave measured at the detecting site;

converting the seismic acceleration signals into a plurality of ground velocities and ground displacements of the primary wave;

obtaining a peak ground displacement within a first duration;

calculating a seismic fracture time parameter according to the ground velocities and the ground displacements within a second duration, thereby calculating a seismic magnitude of the earthquake at the detecting site;

calculating an epicentral distance according to the peak ground displacement and the seismic magnitude;

according to the seismic magnitude and the epicentral distance, calculating a peak ground acceleration (PGA) of the shear wave of the earthquake arriving at the detecting site;

comparing the data of the peak ground acceleration PGA with a predetermined intensity classification, and issuing an earthquake pre-alarm for the on-site area at the detecting site if the system determines that the data of the peak ground acceleration PGA exceeds the predetermined intensity classification, thereby triggering a disaster evacuating procedure or a damage control procedure.

7. The method according to claim 6 further comprising a step of determining whether the earthquake is a seismic event according to a seism determining logic, the seism determining logic comprises an Optimized STA/LTA Method (Optimized Short Term Averaging over Long Term Averaging Method).

8. The method according to claim 6 further comprising a step of supplementing required data for the seismic acceleration signals within the first duration to complete a complete period of the primary wave, so as to amend a Fourier Amplitude-Frequency Curve of the primary wave and obtain an estimated seismic main frequency of the shear wave.

9. The method according to claim 6 further comprising a step of mirroring the seismic acceleration signals within the first duration to supplement the required data for the complete period of the primary wave.

10. The method according to claim 6 further comprising a step of utilizing the Fourier Amplitude-Frequency Curve with a ½ frequency of the primary wave as an estimated Fourier Amplitude-Frequency Curve of the shear wave, so as to obtain the estimated seismic main frequency of the shear wave.

11. The method according to claim 10, wherein the first duration is defined as a full period or a ½ period of the primary wave.

12. The method according to claim 10, wherein the second duration is defined as a full period of the primary wave.

* * * * *